United States Patent
Araki et al.

(10) Patent No.: US 10,144,004 B2
(45) Date of Patent: Dec. 4, 2018

(54) METHOD FOR PRODUCING CATALYST COMPOSITION FOR HYDROGENATION AND CATALYST COMPOSITION FOR HYDROGENATION

(71) Applicant: Asahi Kasei Chemicals Corporation, Tokyo (JP)

(72) Inventors: Yoshifumi Araki, Tokyo (JP); Eiji Sasaya, Tokyo (JP); Katsunori Nitta, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 14/437,640

(22) PCT Filed: Oct. 22, 2013

(86) PCT No.: PCT/JP2013/078596
§ 371 (c)(1),
(2) Date: Apr. 22, 2015

(87) PCT Pub. No.: WO2014/065283
PCT Pub. Date: May 1, 2014

(65) Prior Publication Data
US 2015/0298112 A1 Oct. 22, 2015

(30) Foreign Application Priority Data

Oct. 24, 2012 (JP) .................. 2012-235006
Oct. 24, 2012 (JP) .................. 2012-235009

(51) Int. Cl.
| | |
|---|---|
| *B01J 31/22* | (2006.01) |
| *B01J 31/02* | (2006.01) |
| *B01J 31/12* | (2006.01) |
| *B01J 31/14* | (2006.01) |
| *B01J 31/06* | (2006.01) |

(52) U.S. Cl.
CPC ....... *B01J 31/2295* (2013.01); *B01J 31/0204* (2013.01); *B01J 31/0237* (2013.01); *B01J 31/06* (2013.01); *B01J 31/122* (2013.01); *B01J 31/143* (2013.01); *B01J 31/22* (2013.01); *B01J 31/2282* (2013.01); *B01J 31/2291* (2013.01); *B01J 2231/645* (2013.01); *B01J 2531/46* (2013.01)

(58) Field of Classification Search
None
See application file for complete search history.

(56) References Cited

U.S. PATENT DOCUMENTS 4,980,421 A 12/1990 Teramoto et al.
8,080,506 B2 12/2011 Shida et al.
(Continued)

FOREIGN PATENT DOCUMENTS

JP 61047706 A 3/1986
JP 61028507 A 6/1986
(Continued)

OTHER PUBLICATIONS

JP 08-041081, a machine translation.*
(Continued)

*Primary Examiner* — Yun Qian
(74) *Attorney, Agent, or Firm* — Morgan, Lewis & Bockius LLP

(57) ABSTRACT

A method for producing a catalyst composition for hydrogenation, wherein:

(A): a titanocene compound represented by following general formula (1):

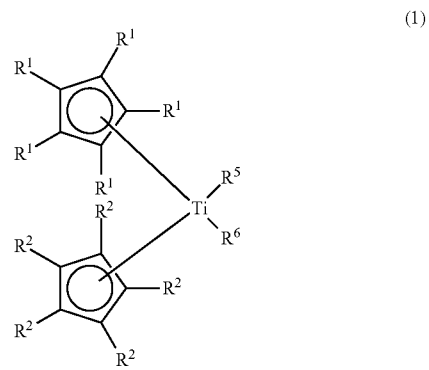

wherein $R^5$ and $R^6$ represent a group selected from the group consisting of hydrogen, a hydrocarbon group having 1 to 12 carbon atoms, an aryloxy group, an alkoxy group, a halogen group and a carbonyl group, and may be the same or different, and $R^1$ and $R^2$ represent a group selected from the group consisting of hydrogen and a hydrocarbon group having 1 to 12 carbon atoms, and may be the same or different, provided that $R^1$ and $R^2$ represent are not all hydrogens or all hydrocarbon groups having 1 to 12 carbon atoms;

(B): a compound containing at least one element selected from the group consisting of elements Li, Na, K, Mg, Zn, Al, and Ca; and (C): an unsaturated compound are used, and
the method has:
a force application step of applying a shearing force at a shearing rate of 1000 (1/s) or more to at least component (A); and
a step of mixing components (A), (B), and (C).

19 Claims, No Drawings

(56) References Cited

U.S. PATENT DOCUMENTS

| | | | |
|---|---|---|---|
| 2004/0116632 A1* | 6/2004 | Masi | C07F 17/00 526/170 |
| 2006/0258814 A1 | 11/2006 | Viola et al. | |
| 2009/0173665 A1 | 7/2009 | Zhou et al. | |
| 2010/0255185 A1 | 10/2010 | Bahnmueller et al. | |

FOREIGN PATENT DOCUMENTS

| | | | |
|---|---|---|---|
| JP | 61033132 A | | 7/1986 |
| JP | 62209103 A | | 9/1987 |
| JP | 63005402 A | | 1/1988 |
| JP | 01275605 A | | 11/1989 |
| JP | 02172537 A | | 7/1990 |
| JP | 04096904 A | | 3/1992 |
| JP | H08-27216 A | | 1/1996 |
| JP | 08033846 A | | 2/1996 |
| JP | 08041081 A | | 2/1996 |
| JP | 2004-269665 | * | 9/2004 ................ C08F 8/04 |
| JP | 2004269665 A | | 9/2004 |
| JP | 2006316275 A | | 11/2006 |

OTHER PUBLICATIONS

European Search Report issued in corresponding European application No. 13848476.1 dated Sep. 16, 2015.
International Search Report issued in corresponding International Patent Application No. PCT/JP2013/078596 dated Nov. 19, 2013.
Kubik, Stefan, ed., "Unsaturated," XP055321514, https://roempp.thieme.de/roempp4.0/do/data/RD-21-00497 (Nov. 30, 2005).
International Preliminary Report on Patentability issued in corresponding International Patent Application No. PCT/JP2013/078596 dated Apr. 28, 2015.

* cited by examiner

METHOD FOR PRODUCING CATALYST COMPOSITION FOR HYDROGENATION AND CATALYST COMPOSITION FOR HYDROGENATION

TECHNICAL FIELD

The present invention relates to a method for producing a catalyst composition for hydrogenation and a catalyst composition for hydrogenation.

BACKGROUND ART

Conventionally, generally, a catalyst of a heterogeneous system and a catalyst of a homogeneous system are known as a catalyst for hydrogenation to be used in the step of hydrogenating an olefinic compound.

Although the catalyst of the heterogeneous system generally is industrially widely used, the catalyst of the heterogeneous system have lower activity than that of the latter catalyst of the homogeneous system and have the problem of being economically inefficient, because the catalysts of the heterogeneous system is required to be used at a large amount for a desired hydrogenation reaction, and the reaction is at a high temperature and a high pressure.

On the other hand, since a hydrogenation reaction using the catalyst of the homogeneous system generally proceeds in a homogeneous system, there are features that the catalyst of the homogeneous system have a higher activity, require a lower amount of used catalyst, and are capable of hydrogenation at a lower temperature and a lower pressure than the catalyst of the heterogeneous system. However, the catalyst of the homogeneous system have the drawbacks that the catalysts preparation is complex, the stability of the catalyst itself is low, reproducibilities are poor, and side reactions tend to occur. Moreover, the catalyst of the homogeneous system also have the problem that sufficient activity of hydrogenation is not obtained when hydrogenating a alkyl-substituted olefinic unsaturated double bond having a steric hindrance.

Accordingly, there is currently a strong need for the development of a catalyst of hydrogenation which has a high activity and which can be handled easily.

On the other hand, for a polymer containing an olefinic unsaturated double bond, although the unsaturated double bond is advantageously utilized in vulcanization and the like, due to this double bond, the polymer also has drawbacks regarding poor stability, such as heat resistance and oxidation resistance. Such the drawback regarding poor stability is substantially improved by hydrogenating the polymer to remove the unsaturated double bonds in the polymer chain.

However, when hydrogenating the polymer, as compared with hydrogenating a low-molecular-weight compound, the polymer is more easily affected by the viscosity of the reaction system, steric hindrance of the polymer chain and the like, which makes hydrogenation more difficult. In addition, there is a problem that it is difficult to physically remove all the catalyst, after hydrogenation has finished. Therefore, there is a problem of causing filter clogging to an extruder used upon the production of a hydrogenated unsaturated double bond-containing compound.

As described above, there has long been an issue for obtaining a catalyst composition for hydrogenation that is economically efficient not to need to be used in a large amount, has a high storage stability, can exhibit sufficient activity of hydrogenation even when hydrogenating olefinic unsaturated double bonds having a steric hindrance, and has a low degree of filter clogging in an extruder upon the production of a hydrogenated unsaturated double bond-containing compound.

Patent Literatures 1 and 2 disclose a method of hydrogenating an olefinic compound using a combination of a specific titanocene compound and an alkyllithium; Patent Literatures 3 and 4 disclose a method of hydrogenating an olefinic unsaturated (co)polymer using a combination of a metallocene compound, with organic aluminum, organic zinc, organic magnesium and the like; and Patent Literatures 5 and 6 disclose a method of hydrogenating an olefinic unsaturated group-containing living polymer using a combination of a specific titanocene compound and an alkyllithium.

Moreover, Patent Literature 7 discloses a method of hydrogenating an olefinic double bond in an olefinic unsaturated double bond-containing polymer using a combination of a specific titanocene compound and an alkoxylithium. This method requires an expensive organic metal compound other than alkoxylithium as a reductant.

Furthermore, Patent Literature 8 discloses a method of hydrogenating an olefinic unsaturated double bond-containing polymer using a combination of a specific titanocene compound, an olefin compound, and a reductant.

Further, Patent Literature 9 discloses a method of hydrogenating an olefin compound using a combination of a metallocene compound having a pentamethylcyclopentadienyl group, which is formed by substituting all of five hydrogens of a cyclopentadienyl group with methyl groups, and a reductant.

Still further, Patent Literatures 10 and 11 disclose a method of hydrogenating an olefin compound using a catalyst composition for hydrogenation comprising a specific titanocene compound, a reductant, an olefinic unsaturated double bond-containing polymer, and a polar compound.

Still further, Patent Literature 12 discloses a method of hydrogenating an olefin compound using a catalyst composition for hydrogenation comprising a specific metallocene compound and a compound selected from a conjugated diene monomer, an acetylenic compound and an acetylenic monomer.

CITATION LIST

Patent Literature

Patent Literature 1: Japanese Patent Laid-Open No. 61-33132
Patent Literature 2: Japanese Patent Laid-Open No. 1-53851
Patent Literature 3: Japanese Patent Laid-Open No. 61-28507
Patent Literature 4: Japanese Patent Laid-Open No. 62-209103
Patent Literature 5: Japanese Patent Laid-Open No. 61-47706
Patent Literature 6: Japanese Patent Laid-Open No. 63-5402
Patent Literature 7: Japanese Patent Laid-Open No. 1-275605
Patent Literature 8: Japanese Patent Laid-Open No. 2-172537
Patent Literature 9: Japanese Patent Laid-Open No. 4-96904
Patent Literature 10: Japanese Patent Laid-Open No. 08-33846
Patent Literature 11: Japanese Patent Laid-Open No. 08-41081
Patent Literature 12: Japanese Patent Laid-Open No. 2004-269665

SUMMARY OF INVENTION

Technical Problem

However, in all of the above-described prior art techniques, sufficient properties such as activity of hydrogenation, storage stability, and a low degree of filter clogging in an extruder upon production, have not yet been achieved.

Accordingly, it is an object of the present invention to provide a method for producing a catalyst composition for hydrogenation, which is capable of hydrogenating olefinic unsaturated double bond-containing compounds (including polymers containing olefinic unsaturated double bonds) with an economical advantage, and which has excellent storage stability, high activity of hydrogenation, and a low degree of filter clogging in an extruder upon the production of a hydrogenated unsaturated double bond-containing compound.

Solution to Problem

As a result of intensive studies to solve the problems of the prior art techniques, the present inventors have found that the problems in the above-described prior art techniques can be solved by producing a catalyst composition for hydrogenation containing a predetermined titanocene compound (A), a compound containing a predetermined metal element (B), and an unsaturated compound (C), under predetermined conditions, thereby completing the present invention.

Namely, the present invention is as follows.

[1]

A method for producing a catalyst composition for hydrogenation, wherein:

(A): a titanocene compound represented by following general formula (1):

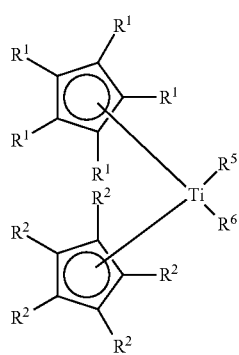

(1)

wherein $R^5$ and $R^6$ represent a group selected from the group consisting of hydrogen, a hydrocarbon group having 1 to 12 carbon atoms, an aryloxy group, an alkoxy group, a halogen group, and a carbonyl group, and may be the same or different, and $R^1$ and $R^2$ represent a group selected from the group consisting of hydrogen and a hydrocarbon group having 1 to 12 carbon atoms, and may be the same or different, provided that $R^1$ and $R^2$ are not all hydrogens or all hydrocarbon groups having 1 to 12 carbons;

(B): a compound containing at least one element selected from the group consisting of elements Li, Na, K, Mg, Zn, Al, and Ca; and (C): an unsaturated compound are used, and the method comprises:

a force application step of applying a shearing force at a shearing rate of 1000 (1/s) or more to at least component (A); and a step of mixing components (A), (B), and (C).

[2]

The method for producing the catalyst composition for hydrogenation according to [1] above, wherein the (C) is an unsaturated polymer (C1) having a fraction of an olefinic unsaturated double bond content of the side chains based on a total olefinic unsaturated double bond content is 0.25 to 1.0.

[3]

The method for producing the catalyst composition for hydrogenation according to [1] above, wherein the (C) is an unsaturated compound (C2) having a molecular weight of 400 or less.

[4]

The method for producing the catalyst composition for hydrogenation according to any one of [1] to [3] above, wherein the mass ratio of the (C) to the (A) ((C)/(A)) is set in a range of 0.1 to 8.

[5]

The method for producing the catalyst composition for hydrogenation according to any one of [1] to [4] above, wherein the mass ratio of the (C) to the (A) ((C)/(A)) is set in a range of 0.1 to 4.

[6]

The method for producing the catalyst composition for hydrogenation according to any one of [1], [2], [4], and [5] above, wherein the (C) is an unsaturated polymer (C1) having a fraction of an olefinic unsaturated double bond content of the side chains based on a total olefinic unsaturated double bond content is 0.25 to 1.0, and the mass ratio of the (C1) and the (A) ((C1)/(A)) is set in a range of 0.3 to 8.

[7]

The method for producing the catalyst composition for hydrogenation according to any one of [1] to [6] above, comprises:

the step of mixing after the (A) and the (B), after the force application step.

[8]

The method for producing the catalyst composition for hydrogenation according to [7] above, comprises:

the step of mixing after the (B) is added to a mixture of the (A) and the (C), after the force application step.

[9]

The method for producing the catalyst composition for hydrogenation according to [8] above, comprises:

the step of mixing the (A), the (B), and the (C) after or during the force application step of applying a shearing force at a shearing rate of 1000 (1/s) or more is applied to a mixture of the (A) and the (C).

[10]

The method for producing the catalyst composition for hydrogenation according to any one of [1] to [9] above, further comprising a step of mixing a polar compound (D), wherein a mass ratio of the (D) and the (A) ((D)/(A)) is set in a range of 0.01 to 2.

[11]

The method for producing the catalyst composition for hydrogenation according to any one of [1] to [10] above, further comprising a step of mixing a polar compound (D), wherein a mass ratio of the (D) and the (A) ((D)/(A)) is set in a range of 0.01 to 1.

[12]

The method for producing the catalyst composition for hydrogenation according to any one of [1] to [11] above, wherein the (B) is an organic lithium compound.

[13]

The method for producing the catalyst composition for hydrogenation according to any one of [1] to [12] above, wherein a conjugated diene polymer, or a copolymer formed of a conjugated diene and a vinyl aromatic hydrocarbon is used as the unsaturated compound (C).

[14]

A catalyst composition for hydrogenation obtained by the method for producing the catalyst composition for hydrogenation according to any one of [1] to [13] above.

Advantageous Effects of Invention

According to the present invention, a method for producing a catalyst composition for hydrogenation having high activity of hydrogenation both at the initial stage of production and after storage thereof, excellent storage stability, and a low degree of filter clogging in an extruder upon the production of a hydrogenated unsaturated double bond-containing compound, can be provided.

DESCRIPTION OF EMBODIMENTS

An embodiment for carrying out the present invention (hereinafter referred to as "present embodiment") will be described in detail below. The present embodiment described below is an example for describing the present invention. The present invention is not limited to the following content, and may be appropriately modified within the scope thereof.

[Method for Producing Catalyst Composition for Hydrogenation]

The method for producing a catalyst composition for hydrogenation of the present embodiment comprises using:

a titanocene compound (A) represented by the following general formula (1), following (B) and (C):

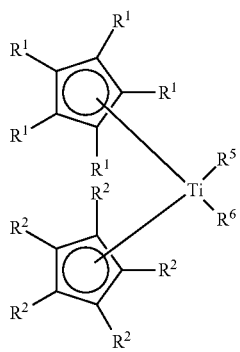

(1)

wherein $R^5$ and $R^6$ represent a group selected from the group consisting of hydrogen, a hydrocarbon group, an aryloxy group, an alkoxy group, a halogen group and a carbonyl group, and may be the same or different, and $R^1$ and $R^2$ represent a group selected from the group consisting of hydrogen and a hydrocarbon group having 1 to 12 carbon atoms, and may be the same or different, provided that $R^1$ and $R^2$ are not all hydrogens or all hydrocarbon groups having 1 to 12 carbon atoms.

In formula (1), the hydrocarbon group having 1 to 12 carbon atoms represented by $R^1$, $R^2$, $R^5$, and $R^6$ includes, for example, a substituent represented by following general formula (2):

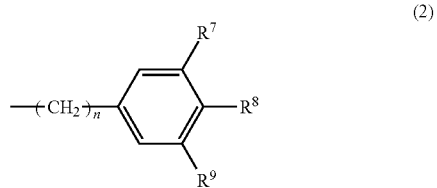

(2)

wherein $R^7$ to $R^9$ represent hydrogen or an alkyl hydrocarbon group having 1 to 4 carbon atoms, provided that at least one of $R^7$ to $R^9$ is hydrogen; and n=0 or 1.

(B): a compound containing at least one element selected from the group consisting of elements Li, Na, K, Mg, Zn, Al, and Ca; and (C): an unsaturated compound.

The method for producing a catalyst composition for hydrogenation of the present embodiment comprises a force application step of applying a shearing force at a shearing rate of 1000 (1/s) or more to at least the (A), and a step of mixing the (A), the (B), and the (C).

First, components used to produce a catalyst composition for hydrogenation of interest will be described.

(Component (A): Titanocene Compound)

Examples of component (A): a titanocene compound include, but are not limited to, bis(η(5)-methylcyclopentadienyl)titanium dihydride, bis(η(5)-1,3-dimethylcyclopentadienyl)titanium dihydride, bis(η(5)-ethylcyclopentadienyl)titanium dihydride, bis(η(5)-propylcyclopentadienyl)titanium dihydride, bis(η(5)-n-butylcyclopentadienyl)titanium dihydride, bis(η(5)-methylcyclopentadienyl)titanium dimethyl, bis(η(5)-1,3-dimethylcyclopentadienyl)titanium dimethyl, bis(η(5)-ethylcyclopentadienyl)titanium dimethyl, bis(η(5)-propylcyclopentadienyl)titanium dimethyl, bis(η(5)-n-butylcyclopentadienyl) titanium dimethyl, bis(η(5)-methylcyclopentadienyl)titanium diethyl, bis(η(5)-1,3-dimethylcyclopentadienyl)titanium diethyl, bis(η(5)-ethylcyclopentadienyl)titanium diethyl, bis(η(5)-propylcyclopentadienyl)titanium diethyl, bis(η(5)-n-butylcyclopentadienyl)titanium diethyl, bis(η(5)-methylcyclopentadienyl)titanium di-sec-butyl, bis(η(5)-1,3-dimethylcyclopentadienyl)titanium di-sec-butyl, bis(η(5)-ethylcyclopentadienyl)titanium di-sec-butyl, bis(η(5)-propylcyclopentadienyl)titanium di-sec-butyl, bis(η(5)-n-butylcyclopentadienyl)titanium di-sec-butyl, bis(η(5)-methylcyclopentadienyl)titanium dihexyl, bis(η(5)-1,3-dimethylcyclopentadienyl)titanium dihexyl, bis(η(5)-ethylcyclopentadienyl)titanium dihexyl, bis(η(5)-propylcyclopentadienyl)titanium dihexyl, bis(η(5)-n-butylcyclopentadienyl)titanium dihexyl, bis(η(5)-methylcyclopentadienyl)titanium dioctyl, bis(η(5)-1,3-dimethylcyclopentadienyl)titanium dioctyl, bis(η(5)-ethylcyclopentadienyl)titanium dioctyl, bis(η(5)-propylcyclopentadienyl)titanium dioctyl, bis(η(5)-n-butylcyclopentadienyl)titanium dioctyl, bis(η(5)- methylcyclopentadienyl)titanium dimethoxide, bis(η(5)-1,3-dimethylcyclopentadienyl)titanium dimethoxide, bis(η(5)-ethylcyclopentadienyl)titanium dimethoxide, bis(η(5)-propylcyclopentadienyl)titanium dimethoxide, bis(η(5)-n-butylcyclopentadienyl)titanium dimethoxide, bis(η(5)-methylcyclopentadienyl)titanium diethoxide, bis(η(5)-1,3-dimethylcyclopentadienyl)titanium diethoxide, bis(η(5)-ethylcyclopentadienyl)titanium diethoxide, bis(η(5)-propylcyclopentadienyl)titanium diethoxide, bis(η(5)-n-butylcyclopentadienyl) titanium diethoxide, bis(η(5)-methylcyclopentadienyl)titanium dipropoxide, bis(η(5)-dimethylcyclopentadienyl)titanium dipropoxide, bis(η(5)-ethylcyclopentadienyl)titanium dipropoxide, bis(η(5)-propylcyclopentadienyl)titanium dipropoxide, bis(η(5)-n-butylcyclopentadienyl) titanium dipropoxide, bis(η(5)-methylcyclopentadienyl)titanium dibutoxide, bis(η(5)-1,3-dimethylcyclopentadienyl)titanium dibutoxide, bis(η(5)-ethylcyclopentadienyl)titanium dibutoxide, bis(η(5)-propylcyclopentadienyl)titanium dibutoxide, bis(η(5)-n-butylcyclopentadienyl) titanium dibutoxide, bis(η(5)-methylcyclopentadienyl)titanium diphenyl, bis(η(5)-1,3-dimethylcyclopentadienyl)titanium diphenyl, bis(η(5)-ethylcyclopentadienyl)titanium diphenyl, bis(η(5)-propylcyclopentadienyl)titanium diphenyl, bis(η(5)-n-butylcyclopentadienyl) titanium diphenyl, bis(η(5)-methylcyclopentadienyl)titanium di(m-tolyl), bis(η(5)-1,3-dimethylcyclopentadienyl)titanium di(m-tolyl), bis(η(5)-ethylcyclopentadienyl)titanium di(m-tolyl), bis(η(5)-propylcyclopentadienyl)titanium di(m-tolyl), bis(η(5)-n-butylcyclopentadienyl)titanium di(m-tolyl), bis(η(5)-methylcyclopentadienyl)titanium di(p-tolyl), bis(η(5)-1,3-methylcyclopentadienyl)titanium di(p-tolyl), bis(η(5)-ethylcyclopentadienyl)titanium di(p-tolyl), bis(η(5)-propylcyclopentadienyl)titanium di(p-tolyl), bis(η(5)-n-butylcyclopentadienyl)titanium di(p-tolyl), bis(η(5)-methylcyclopentadienyl)titanium di(m,p-xylyl), bis(η(5)-1,3-dimethylcyclopentadienyl)titanium di(m,p-xylyl), bis(η(5)-ethylcyclopentadienyl)titanium di(m,p-xylyl), bis(η(5)-propylcyclopentadienyl)titanium di(m,p-xylyl), bis(η(5)-n-butylcyclopentadienyl)titanium di(m,p-xylyl), bis(η(5)-methylcyclopentadienyl)titanium di(4-ethyl phenyl), bis(η(5)-1,3-dimethylcyclopentadienyl)titanium di(4-ethyl phenyl), bis(η(5)-ethylcyclopentadienyl)titanium di(4-ethyl phenyl), bis(η(5)-propylcyclopentadienyl)titanium di(4-ethyl phenyl), bis(η(5)-n-butylcyclopentadienyl)titanium di(4-ethyl phenyl), bis(η(5)-methylcyclopentadienyl)titanium di(4-hexyl phenyl), bis(η(5)-1,3-dimethylcyclopentadienyl)titanium di(4-hexyl phenyl), bis(η(5)-ethylcyclopentadienyl)titanium di(4-hexyl phenyl), bis(η(5)-propylcyclopentadienyl)titanium di(4-hexyl phenyl), bis(η(5)-n-butylcyclopentadienyl)titanium di(4-hexyl phenyl), bis(η(5)-methylcyclopentadienyl)titanium diphenoxide, bis(η(5)-1,3-dimethylcyclopentadienyl)titanium diphenoxide, bis(η(5)-ethylcyclopentadienyl)titanium diphenoxide, bis(η(5)-propylcyclopentadienyl)titanium diphenoxide, bis(η(5)-n-butylcyclopentadienyl)titanium di(4-hexyl phenyl), bis(η(5)-methylcyclopentadienyl)titanium difluoride, bis(η(5)-1,3-dimethylcyclopentadienyl)titanium difluoride, bis(η(5)-ethylcyclopentadienyl)titanium difluoride, bis(η(5)-propylcyclopentadienyl)titanium difluoride, bis(η(5)-n-butylcyclopentadienyl)titanium difluoride, bis(η(5)-methylcyclopentadienyl)titanium dichloride, bis(η(5)-1,3-dimethylcyclopentadienyl)titanium dichloride, bis(η(5)-ethylcyclopentadienyl)titanium dichloride, bis(η(5)-propylcyclopentadienyl)titanium dichloride, bis(η(5)-n-butylcyclopentadienyl) titanium dichloride, bis(η(5)-methylcyclopentadienyl)titanium dibromide, bis(η(5)-1,3-dimethylcyclopentadienyl)titanium dibromide, bis(η(5)-ethylcyclopentadienyl)titanium dibromide, bis(η(5)-propylcyclopentadienyl)titanium dibromide, bis(η(5)-n-butylcyclopentadienyl) titanium dibromide, bis(η(5)-methylcyclopentadienyl)titanium diiodide, bis(η(5)-1,3-dimethylcyclopentadienyl)titanium diiodide, bis(η(5)-ethylcyclopentadienyl)titanium diiodide, bis(η(5)-propylcyclopentadienyl)titanium diiodide, bis(η(5)-n-butylcyclopentadienyl) titanium diiodide, bis(η(5)-methylcyclopentadienyl)titanium chloride methyl, bis(η(5)-di-1,3-methylcyclopentadienyl)titanium chloride methyl, bis(η(5)-ethylcyclopentadienyl)titanium chloride methyl, bis(η(5)-propylcyclopentadienyl)titanium chloride methyl, bis(η(5)-n-butylcyclopentadienyl)titanium chloride methyl, bis(η(5)-methylcyclopentadienyl) titanium chloride ethoxide, bis(η(5)-1,3-dimethylcyclopentadienyl) titanium chloride ethoxide, bis(η(5)-ethylcyclopentadienyl) titanium chloride ethoxide, bis(η(5)-propylcyclopentadienyl) titanium chloride ethoxide, bis(η(5)-n-butylcyclopentadienyl) titanium chloride ethoxide, bis(η(5)-methylcyclopentadienyl)titanium chloride phenoxaide, bis(η(5)-1,3-dimethylcyclopentadienyl)titanium chloride phenoxaide, bis(η(5)-ethylcyclopentadienyl)titanium chloride phenoxaide, bis(η(5)-propylcyclopentadienyl)titanium chloride phenoxaide, bis(η(5)-n-butylcyclopentadienyl)titanium chloride phenoxaide, bis(η(5)-methylcyclopentadienyl)titanium dibenzyl, bis(η(5)-1,3-dimethylcyclopentadienyl)titanium dibenzyl, bis(η(5)-ethylcyclopentadienyl)titanium dibenzyl, bis(η(5)-propylcyclopentadienyl)titanium dibenzyl, bis(η(5)-n-butylcyclopentadienyl)titanium dibenzyl, bis(η(5)-methylcyclopentadienyl)titanium dicarbonyl, bis(η(5)-1,3-dimethylcyclopentadienyl)titanium dicarbonyl, bis(η(5)-ethylcyclopentadienyl)titanium dicarbonyl, bis(η(5)-propylcyclopentadienyl)titanium dicarbonyl, bis(η(5)-n-butylcyclopentadienyl) titanium dicarbonyl.

These compounds may be used alone as one kind or in combination of two kinds or more.

The titanocene compound having these alkyl group-substituted cyclopentadienyl groups is not limited to the above-described examples. Titanocene compounds other than those described above having two, three, or four alkyl group substituents on the cyclopentadienyl ring may also be preferably used.

Using the above-described various types of titanocene compounds, a catalyst composition for hydrogenation obtained by the production method of the present embodiment hydrogenates the olefinic unsaturated double bond of the olefinic compound (an olefinic unsaturated double bond-containing compound; hereinafter also referred to as simply an "olefin compound"), and the catalyst composition for hydrogenation is also excellent in heat resistance.

Especially, to obtain a catalyst composition for hydrogenation, which has a high activity of hydrogenating an olefinic unsaturated double bond of a conjugated diene polymer, or a copolymer formed of a conjugated diene and a vinyl aromatic hydrocarbon, and which is capable of hydrogenating the unsaturated double bond in a wide temperature range, preferred examples used as component (A): a titanocene compound include bis(η(5)-methylcyclopentadienyl)titanium dichloride, bis(η(5)-ethylcyclopentadienyl) titanium dichloride, bis(η(5)-propylcyclopentadienyl)titanium dichloride, bis(η(5)-n-butylcyclopentadienyl) titanium dichloride, bis(η(5)-methylcyclopentadienyl)titanium dimethyl, bis(η(5)-ethylcyclopentadienyl)titanium dimethyl, bis(η(5)-propylcyclopentadienyl)titanium dimethyl, bis(η(5)-n-butylcyclopentadienyl) titanium dimethyl, bis(η(5)- methylcyclopentadienyl)titanium di(p-tolyl), bis(η(5)-ethylcyclopentadienyl)titanium di(p-tolyl), bis(η(5)-propylcyclopentadienyl)titanium di(p-tolyl), bis(η(5)-n-butylcyclopentadienyl)titanium di(p-tolyl), bis(η(5)-methylcyclopentadienyl)titanium diphenyl, bis(η(5)-ethylcyclopentadienyl)titanium diphenyl, bis(η(5)-propylcyclopentadienyl)titanium diphenyl, bis(η(5)-n-butylcyclopentadienyl) titanium diphenyl.

Moreover, from the perspective of being stable handling in the air, preferred examples used as component (A): a titanocene compound include bis(η(5)-methylcyclopentadienyl)titanium dichloride, bis(η(5)-n-butylcyclopentadienyl) titanium dichloride, bis(η(5)-methylcyclopentadienyl)titanium diphenyl, bis(η(5)-n-butylcyclopentadienyl) titanium diphenyl, bis(η(5)-methylcyclopentadienyl)titanium di(p-tolyl), and bis(η(5)-n-butylcyclopentadienyl)titanium di(p-tolyl).

The above-described titanocene compound as component (A) can be synthesized, for example, by reacting a tetravalent titanocene halogen compound having a cyclopentadienyl group having an alkyl substituent with with an aryl lithium.

The structure of the synthesized titanocene compound can be identified using 1H-NMR and MS spectra.

((B): Compound Containing at Least One Element Selected from the Group Consisting of Elements Li, Na, K, Mg, Zn, Al, and Ca)

As the above described (B) (hereinafter also referred to as a "compound (B)," a "component (B)," a "(B) component," or "(B)"), among known organic metal compounds and metal-containing compounds that are capable of reducing above-described component (A), compounds containing at least one element selected from the group consisting of elements Li, Na, K, Mg, Zn, Al, and Ca, are used.

Examples of component (B), but are not limited to, include an organic lithium compound, an organic sodium compound, an organic potassium compound, an organic zinc compound, an organic magnesium compound, an organic aluminum compound, and an organic calcium compound.

These compounds may be used alone as one kind, or in combination of two kinds or more.

Examples of the organic lithium compound as component (B) include, but are not limited to, methyllithium, ethyllithium, n-propyllithium, isopropyllithium, n-butyllithium, sec-butyllithium, isobutyllithium, t-butyllithium, n-pentyllithium, n-hexyllithium, phenyllithium, cyclopentadienyllithium, m-tolyllithium, p-tolyllithium, xylyllithium, dimethylaminolithium, diethylaminolithium, methoxylithium, ethoxylithium, n-propoxylithium, isopropoxylithium, n-butoxylithium, sec-butoxylithium, t-butoxylithium, pentyloxylithium, hexyloxylithium, heptyloxylithium, octyloxylithium, phenoxylithium, 4-methyl phenoxylithium, benzyloxylithium, 4-methyl benzyloxylithium.

Moreover, as component (B), a lithium phenolate compound obtained by reacting a phenolic stabilizer with the above described various types of organic lithium can also be used.

Examples of the phenolic stabilizer include, but are not limited to, 1-oxy-3-methyl-4-isopropyl benzene, 2,6-di-t-butylphenol, 2,6-di-t-butyl-4-ethylphenol, 2,6-di-t-butyl-p-cresol, 2,6-di-t-butyl-4-n-butylphenol, 4-hydroxymethyl-2,6-di-t-butylphenol, butyl hydroxyanisole, 2-(1-methylcyclohexyl)-4,6-dimethylphenol, 2,4-dimethyl-6-t-butylphenol, 2-methyl-4,6-dinonylphenol, 2,6-di-t-butyl-α-dimethyl amino-p-cresol, methylene-bis-(dimethyl-4,6-phenol), 2,2'-methylene-bis-(4-methyl-6-t-butylphenol), 2,2'-methylene-bis-(4-methyl-6-cyclohexylphenol), 2,2'-methylene-bis-(4-ethyl-6-t-butylphenol), 4,4'-methylene-bis-(2,6-di-t-butylphenol), 2,2'-methylene-bis-(6-α-methyl-benzyl-p-cresol).

A particularly preferred example of the phenolic stabilizer is 2,6-di-t-butyl-4-methylphenoxy lithium obtained by substituting with —OLi, the hydroxyl group of 2,6-di-t-butyl-p-cresolmethylphenoxy lithium that is the most common among the above described specific examples of the phenolic stabilizer.

Furthermore, examples of the organic lithium compound used as component (B) also include organic silicon lithium compounds such as trimethylsilyl lithium, diethylmethylsilyl lithium, dimethylethylsilyl lithium, triethylsilyl lithium, and triphenylsilyl lithium, in addition to the above-described compounds.

Examples of the organic sodium compound used as component (B) include, but are not limited to, methyl sodium, ethyl sodium, n-propyl sodium, isopropyl sodium, n-butyl sodium, sec-butyl sodium, isobutyl sodium, t-butyl sodium, n-pentyl sodium, n-hexyl sodium, phenyl sodium, cyclopentadienyl sodium, m-tolyl sodium, p-tolyl sodium, xylyl sodium, and sodium naphthalene.

Examples of the organic potassium compound used as component (B) include, but are not limited to, methyl potassium, ethyl potassium, n-propyl potassium, isopropyl potassium, n-butyl potassium, sec-butyl potassium. isobutyl potassium, t-butyl potassium, n-pentyl potassium, n-hexyl potassium, triphenylmethyl potassium, phenyl potassium, phenylethyl potassium, cyclopentadienyl potassium, m-tolyl potassium, p-tolyl potassium, xylyl potassium, and potassium naphthalene Examples of the organic magnesium compound used as component (B) include, but are not limited to, dimethyl magnesium, diethyl magnesium, dibutyl magnesium, ethylbutyl magnesium, methyl magnesium bromide, ethyl magnesium chloride, ethyl magnesium bromide, ethyl magnesium chloride, phenyl magnesium bromide, phenyl magnesium chloride, t-butyl magnesium chloride, and t-butyl magnesium bromide.

Although component (B) may also be used as a living anionic polymerization initiator of a conjugated diene compound and/or a vinyl aromatic hydrocarbon compound, when an olefin compound, which is the target to be hydrogenated, is a conjugated diene polymer, or a copolymer formed of a conjugated diene and a vinyl aromatic hydrocarbon (a living polymer), having an active end of a metal contained in component (B), such an active end also acts as component (B).

Examples of the organic zinc compound used as component (B) include, but are not limited to, diethylzinc, bis(η (5)-cyclopentadienyl)zinc, and diphenylzinc.

Examples of the organic aluminum compound used as component (B) include, but are not limited to, trimethyl aluminum, triethyl aluminum, triisobutyl aluminum, triphenyl aluminum, diethyl aluminum chloride, dimethyl aluminum chloride, ethyl aluminum dichloride, methyl aluminum sesquichloride, ethyl aluminum sesquichloride, diethyl aluminum hydride, diisobutyl aluminum hydride, triphenyl aluminum, and tri(2-ethylhexyl)aluminum, (2-ethylhexyl) aluminum dichloride, methyl aluminoxane, and ethyl aluminoxane.

In addition to these, alkali (earth) metal hydrides such as lithium hydride, potassium hydride, sodium hydride, and calcium hydride; and hydrides containing two or more types of metals, such as sodium aluminum hydride, potassium aluminum hydride, diisobutyl sodium aluminum hydride, tri(t-butoxy)aluminum hydride, triethyl sodium aluminum hydride, diisobutyl sodium aluminum hydride, triethyl sodium aluminum hydride, triethoxy sodium aluminum hydride, and triethyl lithium aluminum hydride, can also be used as component (B).

Moreover, a complex synthesized by reacting in advance the above described organic alkali metal compound with the organic aluminum compound, a complex synthesized by reacting in advance the organic alkali metal compound with the organic magnesium compound (ate complex), and the like can also be used as component (B).

From the perspective of a high activity of hydrogenation, the organic metal compound and metal-containing compound as component (B) are preferably compounds containing Li or Al.

Preferred examples of the compound containing Li or Al include triethyl aluminum, triisobutyl aluminum, sec-butyl lithium, and n-butyl lithium.

From the perspective of the activity of hydrogenation of a catalyst composition for hydrogenation at the initial stage of production and after storage thereof, and a low degree of filter clogging in an extruder upon the production of a hydrogenated unsaturated double bond-containing compound, an organic lithium compound is more preferable.

((C): Unsaturated Compound)

The (C) that is an unsaturated compound (hereinafter also referred to as "(C) an unsaturated compound," a "(C) component," a "component (C)," or "(C)") is a compound having at least one unsaturated group in a molecule thereof.

In the present embodiment, from the perspective of the capability of hydrogenating an olefinic unsaturated double bond-containing compound with economical advantage, and the capability of producing a polymer having excellent storage stability, good feed properties, and excellent colorlessness by a hydrogenating step, component (C) that is an unsaturated compound is preferably an unsaturated polymer (C1) (hereinafter also referred to as "(C1) an unsaturated polymer, a "(C1) component," a "component (C1)," or "(C1)"), having a fraction of an olefinic unsaturated double bonds content of the side chains based on a total olefinic unsaturated double bond content of 0.25 to 1.0.

Moreover, as described later, from the perspective of the capability of hydrogenating an olefinic unsaturated double bond-containing compound (including a polymer containing an olefinic unsaturated double bond) with economical advantage, and the capability of producing a polymer having excellent storage stability, good feed properties, and excellent colorlessness by a hydrogenating step, component (C) that is an unsaturated compound is also preferably an unsaturated compound (C2) (hereinafter also referred to as "(C2) an unsaturated compound," a "(C2) component," a "component (C2)," or "(C2)") having a molecular weight of 400 or less which has one or more unsaturated groups in a molecule thereof.

Component (C) that is an unsaturated compound can be produced using the after-described predetermined monomer, and component (C1) that is an unsaturated polymer can be produced by polymerizing the after-described predetermined monomer.

Examples of the above described monomer include a conjugated diene, and generally include a conjugated dienes having 4 to about 12 hydrocarbons.

Examples of the monomer include, but are not limited to, 1,3-butadiene, isoprene, 2,3-dimethylbutadiene, 1,3-pentadiene, 2-methyl-1,3-pentadiene, 1,3-hexadiene, 4,5-diethyl-1,3-octadiene, and 3-butyl-1,3-octadiene.

These may be polymerized alone or copolymerized in combinations of two or more. Among these, 1,3-butadiene and isoprene are preferable because they can produce component (C1) in an industrially large scale and are relatively easily handled. Homopolymers or copolymers formed of these monomers, such as polybutadiene, polyisoprene, and a butadiene/isoprene copolymer, are preferable.

Furthermore, a polymer obtained by singly polymerizing norbornadiene, cyclopentadiene, 2,3-dihydrodicyclopentadiene, and an alkyl-substituted product thereof or by copolymerizing two or more of these substances in combination, may also be used.

From the perspective of increasing the fraction of an olefinic unsaturated double bond content of the side chains, component (C1) that is an unsaturated polymer is preferably a conjugated diene polymer, or a copolymer formed of the above described conjugated diene and an aromatic vinyl compound.

Examples of the aromatic vinyl compound include styrene, t-butylstyrene, α-methylstyrene, p-methylstyrene, divinylbenzene, 1,1-diphenylethylene, and N,N-diethyl-p-aminoethylstyrene. Among others, styrene is particularly preferable.

The most preferred examples of the specific copolymer include a butadiene/styrene copolymer and an isoprene/styrene copolymer.

These copolymers may be in any form such as random, block, star-shaped block, tapered block and the like, and are not particularly limited.

When component (C1) that is an unsaturated polymer is a copolymer formed of a conjugated diene and an aromatic vinyl compound, the amount of the aromatic vinyl compound bound is preferably 70% by mass or less.

Component (C1) that is an unsaturated polymer may have a functional group such as a hydroxyl group, a carboxyl group, an amino group, or an epoxy group.

From the perspective of the activity of hydrogenation, handling, feed properties, and storage stability of the catalyst composition for hydrogenation of the present embodiment, the number average molecular weight of component (C1) that is an unsaturated polymer is preferably more than 400, and more preferably 500 or more, and from the perspective of handling, it is preferably 1,000,000 or less.

The number average molecular weight of component (C1) is more preferably 500 or more and 20,000 or less, even more preferably 800 or more and 15,000 or less, and further preferably 1,000 or more and 10,000 or less.

The number average molecular weight of the component (C1) (a value in terms of polystyrene) can be measured by GPC (gel permeation chromatography).

It is to be noted that the term "good feed properties" refers to when feeding a catalyst composition for hydrogenation via a predetermined pipe, after storing the catalyst composition for a certain period of time under a predetermined environment, the ability to continuously maintain a smooth feed state without clogging of the pipe.

Moreover, the term "good handling" refers to a low viscosity when in solution, high mixing properties and rate of transfer, and low susceptibility of adherence to the equipment, the pipe, etc.

From the perspective of the activity of hydrogenation, handling (lowering viscosity of a solution), and storage stability regarding feed properties, of the catalyst composition for hydrogenation produced by the production method of the present embodiment, and a low degree of filter clogging in an extruder upon the production of a hydrogenated unsaturated double bond-containing compound, the fraction of an olefinic unsaturated double bond content of the side chains based on a total olefinic unsaturated double bond content is preferably 0.25 to 1.0 in component (C1) that is an unsaturated polymer.

The fraction of an olefinic unsaturated double bond content of the side chains based on a total olefinic unsaturated double bond content is defined as X=Y/Z, wherein "the fraction of an olefinic unsaturated double bond of the side chains based on total olefinic unsaturated double bond" represents X,

[the number of olefinic unsaturated carbon/carbon double bonds of the side chains of a component polymer], and represents Y, and

[the total number of olefinic unsaturated carbon/carbon double bonds of a component polymer] represents Z, The value of X is preferably in a range of 0.25 to 1.0.

This value range means that when polybutadiene is used as a specific example of component (C1) that is an unsaturated polymer, the fraction of an olefinic unsaturated double bond content of the side chains (1,2 bonds) based on a total olefinic unsaturated double bond content (cis 1,4 bond, trans 1,4 bond, and 1,2 bond) is in a range of 0.25 to 1 (25 to 100 mol %).

The above described X is more preferably in a range of 0.40 to 1.0, even more preferably in a range of 0.50 to 0.95, and further preferably in a range of 0.60 to 0.95.

The above described X that is the fraction of a olefinic unsaturated double bond content of the side chains based on a total olefinic unsaturated double bond content can be measured using NMR.

The mass ratio of above described component (C1) (an unsaturated compound) to above described component (A) (a titanocene compound), (C1)/(A), is preferably 0.1 or more and 8 or less.

From the perspective of the activity of hydrogenation, handling, and storage stability regarding feed properties, of the catalyst composition for hydrogenation produced by the production method of the present embodiment, the mass ratio of above described component (C1) (an unsaturated polymer) to above described component (A) (a titanocene compound), (C1)/(A), is preferably 0.1 or more, and more preferably 0.3 or more. From the perspective of storage stability regarding feed properties, economical efficiency, and further, suppression of the yellowing of a hydrogenated polymer that has been hydrogenated with the catalyst composition for hydrogenation, the mass ratio ((C1)/(A)) is preferably 8 or less, more preferably 4 or less, even more preferably 3 or less, and further preferably 2 or less.

The mass ratio of (C1) to (A) ((C1)/(A)) is more preferably in a range of 0.4 to 5, even more preferably in a range of 0.5 to 3, and further preferably in a range of 0.7 to 2.

Moreover, from the perspective of the activity of hydrogenation, handling (low viscosity), and storage stability regarding feed properties, of the catalyst composition for hydrogenation produced by the production method of the present embodiment, the total olefinic unsaturated double bond content (mol) of the side chains in component (C1) as a whole that is an unsaturated polymer per mol of component (A) that is a titanocene compound is preferably 0.3 mol or more, and from perspective of suppression of the yellowing of the polymer, it is preferably 30 mol or less. Furthermore, it is more preferably in a range of 0.5 mol to 20 mol, even more preferably in a range of 1.0 mol to 15 mol, and further preferably in a range of 2.0 mol to 12 mol.

In the present embodiment, from the perspective of the capability of hydrogenating an olefinic unsaturated double bond-containing compound (including a polymer containing an olefinic unsaturated double bond) with economical advantage, and the capability of producing a polymer having excellent storage stability, good feed properties, and excellent colorlessness by a hydrogenating step, as described above, a compound (C2) (hereinafter also referred to as "(C2) an unsaturated compound," a "(C2) component," a "component (C2)," or "(C2)") that has a molecular weight of 400 or less and has one or more unsaturated groups in a molecule thereof, can also preferably used as component (C) that is an unsaturated compound.

From the perspective of feed properties after the storage of the catalyst composition for hydrogenation, component (C2) has a molecular weight of 400 or less, and the molecular weight is preferably 300 or less, more preferably 200 or less, and further preferably 150 or less.

Component (C2) that is an unsaturated compound may be produced by polymerizing a predetermined monomer.

Examples of the above described monomer include, but are not limited to, conjugated dienes generally having 4 to about 12 hydrocarbons, such as 1,3-butadiene, isoprene, 2,3-dimethylbutadiene, 1,3-pentadiene, 2-methyl-1,3-pentadiene, 1,3-hexadiene, 4,5-diethyl-1,3-octadiene or 3-butyl-1,3-octadiene, monoterpene, a vinyl aromatic compound, norbornadiene, cyclopentadiene, cyclohexadiene, 2,3-dihydrodicyclopentadiene, and acetylenes.

These compounds may be used alone as one kind, or two kinds or more of these compounds may be used in combination and also may be copolymerized with one another.

From the perspective of the activity of hydrogenation of a catalyst composition for hydrogenation obtained by the method for producing a catalyst composition for hydrogenation of the present embodiment at the initial stage of production and after storage thereof, and a low degree of filter clogging in an extruder upon the production of a hydrogenated unsaturated double bond-containing compound, the amount of unsaturated groups in unsaturated compound (C2) has a preferred range.

Specifically, from the perspective of the activity of hydrogenation of a catalyst composition for hydrogenation at the initial stage of production and after storage thereof, and a low degree of filter clogging in an extruder upon the production of a hydrogenated unsaturated double bond-containing compound, the amount of unsaturated groups in 1 mol of component (C2) is preferably 2 mol or more. On the other hand, from the perspective of the activity of hydrogenation and feed properties of a catalyst composition for hydrogenation at the initial stage of production and after storage thereof, a low degree of filter clogging in an extruder upon the production of a hydrogenated unsaturated double bond-containing compound, and suppression of the yellowing of the polymer of a hydrogenated olefin compound, it is in a range of 5 mol or less. The amount of unsaturated groups in 1 mol of component (C2) is more preferably in a range of 2 mol or more and 4 mol or less, even more preferably in a range of 2 mol or more and 3 mol or less, and further preferably 3 mol.

The amount of unsaturated groups in the (C2) can be measured using NMR.

From the perspective of the activity of hydrogenation, handling, and storage stability regarding feed properties of the catalyst composition for hydrogenation produced by the production method of the present embodiment, the mass ratio between component (C2) (an unsaturated compound) and component (A) (a titanocene compound) ((C2)/(A)) is preferably 0.1 or more. On the other hand, from the perspective of storage stability regarding feed properties, economical efficiency, and further, suppression of the yellowing of a hydrogenated polymer that has been hydrogenated with the above described catalyst composition for hydrogenation, the mass ratio ((C2)/(A)) is preferably 8.0 or less.

From the perspective of the activity of hydrogenation, handling, storage stability regarding feed properties, and economical efficiency of the produced catalyst composition for hydrogenation, and suppression of the yellowing of a hydrogenated polymer, the mass ratio of (C2) and (A) (=(C2)/(A)) is preferably in a range of 0.1 to 8, more preferably in a range of 0.1 to 4, even more preferably in a range of 0.5 to 3, and further preferably in a range of 1.0 to 2.5.

As described above, by using an unsaturated compound (C2) having a molecular weight of 400 or less as an unsaturated compound (C), the catalyst composition for hydrogenation produced by the production method of the present embodiment has excellent storage stability, good feed properties, and excellent feed properties even after the storage thereof.

In addition, by setting the amount of unsaturated groups in (C2) in the above-described range based on the molar ratio of (C2) to component (A), the amount of hydrogen added to those other than the olefinic unsaturated double bonds in the polymer as a target to be hydrogenated can be reduced, and as a result, high activity of hydrogenation can be obtained.

(Component (D): Polar Compound)

From the perspective of high activity of hydrogenation at the initial stage of production and after storage, and reduction in filter clogging in an extruder upon the production of a hydrogenated unsaturated double bond-containing compound, it is preferable to further add the following component (D) that is a polar compound (hereinafter also referred to as a "polar compound (D)," a "(D) component," or "D") in the method for producing a catalyst composition for hydrogenation of the present embodiment.

Component (D) that is a polar compound is a compound having N, O or S. Examples of component (D) include an alcohol compound, an ether compound, a thioether compound, a ketone compound, a sulfoxide compound, a carboxylic acid compound, a carboxylate compound, an aldehyde compound, a lactam compound, a lactone compound, an amine compound, an amide compound, a nitrile compound, an epoxy compound, and an oxime compound.

Specific examples of these polar compounds are given below.

Examples of the alcohol compound include, but are not limited to, monohydric alcohols such as methyl alcohol, ethyl alcohol, propyl alcohol, n-butyl alcohol, sec-butyl alcohol, isobutyl alcohol, tert-butyl alcohol, n-amyl alcohol, iso-amyl alcohol, hexyl alcohol and an isomer thereof, heptyl alcohol and an isomer thereof, octyl alcohol and an isomer thereof, capryl alcohol, nonyl alcohol and an isomer thereof, decyl alcohol and an isomer thereof, benzyl alcohol, phenol, cresol and 2,6-di-tert-butyl-p-cresol, and dihydric alcohols such as ethylene glycol, propylene glycol, butanediol, pentyl glycol, hexyl glycol, heptyl glycol, and glycols that are isomers of these alcohols. Moreover, trihydric alcohol such as glycerin, or alcohol compounds having another functional group in a single molecule thereof, such as ethanolamine or glycidyl alcohol, may also be used.

Examples of the ether compound include, but are not limited to, dimethyl ether, diethyl ether, di-n-propyl ether, diisopropyl ether, di-n-butyl ether, di-sec-butyl ether, diphenyl ether, methylethyl ether, ethylbutyl ether, butylvinyl ether, anisole, ethylphenyl ether, ethylene glycol dimethyl ether, ethylene glycol diethyl ether, ethylene glycol dibutyl ether, diethylene glycol dimethyl ether, diethylene glycol diethyl ether, furan, tetrahydrofuran, α-methoxy tetrahydrofuran, pyran, tetrahydropyran, and dioxane.

Moreover, a compound having another functional group in a molecule thereof, such as tetrahydrofurancarboxylic acid, may also be used.

Examples of the thioether compound include, but are not limited to, dimethyl sulfide, diethyl sulfide, di-n-butyl sulfide, di-sec-butyl sulfide, di-tert-butyl sulfide, diphenyl sulfide, methyl ethyl sulfide, ethyl butyl sulfide, thioanisole, ethyl phenyl sulfide, thiophene, and tetrahydrothiophene.

Examples of the ketone compound include, but are not limited to, acetone, diethyl ketone, di-n-propyl ketone, diisopropyl ketone, di-n-butyl ketone, di-sec-butyl ketone, di-tert-butyl ketone, benzophenone, methyl ethyl ketone, acetophenone, benzyl phenyl ketone, propiophenone, cyclopentanone, cyclohexanone, diacetyl, acetyl acetone, and benzoyl acetone.

Examples of the sulfoxide compound include, but are not limited to, dimethyl sulfoxide, diethyl sulfoxide, tetramethylene sulfoxide, pentamethylene sulfoxide, diphenyl sulfoxide, dibenzyl sulfoxide, and p-tolyl sulfoxide.

Examples of the carboxylic acid compound include, but are not limited to, monobasic acids such as formic acid, acetic acid, propionic acid, butyric acid, caproic acid, lauric acid, palmitic acid, stearic acid, cyclohexylpropionic acid, cyclohexylcaproic acid, benzoic acid, phenylacetic acid, o-toluic acid, m-toluic acid, p-toluic acid, acrylic acid and methacrylic acid; dibasic acids such as oxalic acid, maleic acid, malonic acid, fumaric acid, succinic acid, adipic acid, pimelic acid, suberic acid, sebacic acid, itaconic acid, phthalic acid, isophthalic acid, terephthalic acid, naphthalic acid and diphenic acid; polybasic acid such as trimellitic acid, pyromellitic acid; and the derivatives thereof. Moreover, for example, a compound having another functional group in a single molecule thereof, such as hydroxybenzoic acid, may also be used.

Examples of the carboxylate include, but are not limited to, esters formed from monobasic acids such as formic acid, acetic acid, propionic acid, butyric acid, caproic acid, lauric acid, palmitic acid, stearic acid, cyclohexylpropionic acid, cyclohexylcaproic acid, benzoic acid, phenylacetic acid, o-toluic acid, m-toluic acid, p-toluic acid, acrylic acid and methacrylic acid, or dibasic acids such as oxalic acid, maleic acid, malonic acid, fumaric acid, succinic acid, adipic acid, pimelic acid, suberic acid, sebacic acid, itaconic acid, phthalic acid, isophthalic acid, terephthalic acid, naphthalic acid and diphenic acid, with alcohols such as methyl alcohol, ethyl alcohol, propyl alcohol, n-butyl alcohol, sec-butyl alcohol, isobutyl alcohol, tert-butyl alcohol, n-amyl alcohol, iso-amyl alcohol, hexyl alcohol and an isomer thereof, heptyl alcohol and an isomer thereof, octyl alcohol and an isomer thereof, capryl alcohol, nonyl alcohol and an isomer thereof, decyl alcohol and an isomer thereof, benzyl alcohol, phenol, cresol and glycidyl alcohol; and β-ketoesters such as methyl acetoacetate and ethyl acetoacetate.

Examples of the lactone compound include, but are not limited to, β-propiolactone, δ-valerolactone, ε-caprolactone, and lactone compounds corresponding to the following acids.

Namely, examples of the acid include 2-methyl-3-hydroxypropionic acid, 3-hydroxynonane or 3-hydroxypelargonic acid, 2-dodecyl-3-hydroxypropionic acid, 2-cyclopentyl-3-hydroxypropionic acid, 2-n-butyl-3-cyclohexyl-3-hydroxypropionic acid, 2-phenyl-3-hydroxytridecanoic acid, 2-(2-ethylcyclopentyl)-3-hydroxypropionic acid, 2-methyl phenyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 3-(2-cyclohexyl ethyl)-5-hydroxyvaleric acid, 2-(2-phenyl ethyl)-4-(4-cyclohexyl benzyl)-5-hydroxyvaleric acid, benzyl-5-hydroxyvaleric acid, 3-ethyl-5-isopropyl-6-hydroxycaproic acid, 2-cyclopentyl-4-hexyl-6-hydroxycaproic acid, 2-cyclopentyl-4-hexyl-6-hydroxycaproic acid, 3-phenyl-6-hydroxycaproic acid, 3-(3,5-diethyl-cyclohexyl)-5-ethyl-6-hydroxycaproic acid, 4-(3-phenyl-propyl)-6-hydroxycaproic acid, 2-benzyl-5-isobutyl-6-hydroxycaproic acid, 7-phenyl-6-hydroxyl-octoenoic acid, 2,2-di(1-cyclohexenyl)-5-hydroxy-5-heptenoic acid, 2,2-dipropenyl-5-hydroxy-5-heptenoic acid, 2,2-dimethyl-4-propenyl-3-hydroxy-3,5-heptadienoic acid.

Examples of the amine compound include, but are not limited to, methylamine, ethylamine, isopropylamine, n-butylamine, sec-butylamine, tert-butylamine, n-amylamine, sec-amylamine, tert-amylamine, n-hexylamine, n-heptylamine, aniline, benzylamine, o-anisidine, m-anisidine, p-anisidine, α-naphthylamine, dimethylamine, diethylamine, di-n-propylamine, diisopropylamine, di-n-butylamine, di-sec-butylamine, diisobutylamine, di-tert-butylamine, di-n-amylamine, diisoamylamine, dibenzylamine, N-methylamine, N-ethylamine, N-ethyl-o-toluidine, N-ethyl-m-toluidine, N-ethyl-p-toluidine, triethylamine, tri-n-propylamine, tri-n-butylamine, tri-n-amylamine, triisoamylamine, tri-n-hexylamine, tribenzylamine, triphenyl methylamine, N,N-dimethyl benzylamine, N,N-dimethylamine, N,N-diethylamine, N,N-diethyl-o-toluidine, N,N-diethyl-m-toluidine, N,N-diethyl-p-toluidine, N,N-dimethyl-α-naphthylamine, N,N,N',N'-tetramethyl ethylene diamine, N,N,N',N'-tetraethyl ethylene diamine, pyrrolidine, piperidine, N-methylpyrrolidine, N-methylpiperidine, pyridine, piperazine, 2-acetylpyridine, N-benzylpiperazine, quinoline, morpholine.

The above-described amide compound is a compound having at least one —C(=O)—N< or —C(=S)—N< bond in a molecule thereof. Examples of the amide compound include, but are not limited to, N,N-dimethylformamide, N-dimethylacetamide, N-methylpyrrolidone, acetamide, propionamide, benzamide, acetanilide, benzanilide, N-methylacetanilide, N,N-dimethylthioformamide, N,N-dimethyl-N,N'-(p-dimethylamino)benzamide, N-ethylene-N-methyl-8-quiniline carboxyamide, N,N-dimethyl nicotinamide, N,N-dimethyl metaacrylamide, N-methylphthalimide, N-phenylphthalimide, N-acetyl-ε-caprolactam, N,N,N',N'-tetramethylphthalamide, 10-acetylphenoxazine, 3,7-bis(dimethylamino)-10-benzoylphenothiazine, 10-acetylphenothiazine, 3,7-bis)dimethylamino)-10-benzoylphenothiazine, N-ethyl-N-methyl-8-quinoline carboxyamide, and also, linear urea compounds such as N,N'-dimethylurea, N,N'-diethylurea, N,N'-dimethylethyleneurea, N,N,N',N'-tetramethylurea, N,N-dimethyl-N',N'-diethylurea and N,N-dimethyl-N',N'-diphenylurea.

Examples of the nitrile compound include, but are not limited to, 1,3-butadiene monoxide, 1,3-butadiene oxide, 1,2-butylene oxide, 2,3-butylene oxide, cyclohexene oxide, 1,2-epoxycyclododecane, 1,2-epoxydecane, 1,2-epoxyeicosane, 1,2-epoxyheptane, 1,2-epoxyhexadecane, 1,2-epoxyhexadecane, 1,2-epoxyoctadecane, 1,2-epoxyoctane, ethylene glycol diglycidyl ether, 1,2-epoxytetradecane, hexamethylene oxide, isobutylene oxide, 1,7-octadiene epoxide, 2-phenyl propylene oxide, propylene oxide, trans-stilbene oxide, styrene oxide, epoxylated 1,2-polybutadiene, epoxylated inseed oil, glycidyl methyl ether, glycidyl n-butyl ether, glycidyl allyl ether, glycidyl methacrylate, glycidyl acrylate.

Examples of the oxime compound include, but are not limited to, acetoxime, methyl ethyl ketone oxime, diethyl ketone oxime, acetophenone oxime, benzophenone oxime, benzyl phenyl ketone oxime, cyclopentanone oxime, cyclohexanone oxime, and benzaldehyde oxime.

The above described component (D) that is a polar compound may be used alone as one kind or in combinations of two kinds or more.

As such a polar compound, a polar compound having no active hydrogen is preferable. Among others, an amine compound and an ether compound are more preferable, and an amine compound is further preferable.

From the perspective of high activity of hydrogenation of a catalyst composition for hydrogenation produced by the production method of the present embodiment at the initial stage of production and after storage thereof, and a low degree of filter clogging in an extruder upon the production of a hydrogenated unsaturated double bond-containing compound, the mass ratio of component (D) and component (A) ((D)/(A)) is preferably 0.01 or more. On the other hand, from the perspective of storage stability or economical efficiency, the mass ratio ((D)/(A)) is preferably 2 or less.

The mass ratio of component (D) and component (A) ((D)/(A)) is more preferably in a range of 0.01 to 1, even more preferably in a range of 0.015 to 0.50, further preferably in a range of 0.020 to 0.30, and still further preferably in a range of 0.015 to 0.30.

(Mixing Method)

In the method for producing a catalyst composition for hydrogenation of the present embodiment, the above described component (A), component (B) and component (C), and optionally component (D), and optionally using a predetermined solvent are mixed.

From the perspective of high activity of hydrogenation and a low degree of filter clogging in an extruder upon the production of a hydrogenated unsaturated double bond-containing compound, in the method for producing a catalyst composition for hydrogenation of the present embodiment, a shearing force is applied at a shearing rate of 1000 (1/s) or more to at least component (A). This step is referred to as a "force application step" in the present specification.

<Force Application Step>

In the above-described force application step, example of an apparatus for applying a shearing force include, but are not limited to, a stirrer, a homogenizer including emulsification equipment, and a pump.

From the perspective of high activity of hydrogenation or a low degree of filter clogging in an extruder upon the production of a hydrogenated unsaturated double bond-containing compound, the shearing rate is set at 1000 (1/s) or more, and it is preferably 3,000 (1/s) or more, and more preferably 10,000 (1/s) or more.

The term "shearing rate" used herein means a shearing rate at a site at which the shearing rate of the above described apparatus used to apply a shearing force becomes the maximum.

For instance, the shearing rate (Vs) of a device comprising a rotor (rotation portion) that rotates at a constant rate and a stator (fixed portion) is obtained by dividing the peripheral velocity (Vu) of the rotor by a minimum gap (d) between the rotor and the stator (Vs (1/s)=Vu/d).

In general, the peripheral velocity of a rotor increases as the measurement point of the velocity approaches to the outer side of the rotor. Therefore, if gap (d) is constant independent of the place in the device, a value obtained by dividing the peripheral velocity of the outermost side of the rotor by gap (d) is defined as a shearing rate in the present embodiment.

In terms of high activity of hydrogenation and a low degree of filter clogging in an extruder upon the production of a hydrogenated unsaturated double bond-containing compound, the time required for application of such a shearing force is preferably 5 minutes or more and within 72 hours, more preferably 20 minutes or more and within 48 hours, and further preferably within 2 to 24 hours.

If component (A) is a solid, it is preferable to finely crush the solid by applying a shearing force thereto.

From the perspective of high activity of hydrogenation of a catalyst composition for hydrogenation at the initial stage of production and after storage thereof, and a low degree of filter clogging in an extruder upon the production of a hydrogenated unsaturated double bond-containing compound, it is preferable to mix component (A) with component (B) after a shearing force has been applied to component (A).

When component (B) is added to component (A) that is a solid, the mean particle diameter of the component (A) is preferably 100 µm or less, from the perspective of activity of hydrogenation and filter clogging in an extruder. The mean particle diameter of component (A) is more preferably 50 µm or less, even more preferably 30 µm or less, and further preferably 15 µm or less.

The state of component (A) upon application of a shearing force is not particularly limited. It may be any one of a liquid state, a solid-liquid mixed state, and a solid state. From the perspective of handling, the state of component (A) is preferably a liquid state or a solid-liquid mixed state.

From the perspective of high activity of hydrogenation of a catalyst composition for hydrogenation at the initial stage of production and after storage thereof, and a low degree of filter clogging in an extruder upon the production of a hydrogenated unsaturated double bond-containing compound, the method for producing a catalyst composition for hydrogenation of the present embodiment more preferably comprises a step of mixing after adding component (B) to a mixture of component (A) and component (C).

From the perspective of high activity of hydrogenation of a catalyst composition for hydrogenation both at the initial stage of production and after storage thereof, and a low degree of filter clogging in an extruder upon the finishing of a hydrogenated unsaturated double bond-containing compound, the method for producing a catalyst composition for hydrogenation of the present embodiment more preferably comprises a step of mixing component (A), component (B), component (C), and component (D) after adding component (B) to a mixture of component (A) and component (C), after or during the force application step.

From the perspective of high activity of hydrogenation of a catalyst composition for hydrogenation both at the initial stage of production and after storage thereof, and a low degree of filter clogging in an extruder upon the production of a hydrogenated unsaturated double bond-containing compound, the method for producing a catalyst composition for hydrogenation of the present embodiment further preferably comprises a step of mixing component (A), component (B), component (C), and component (D) after adding component (B) to a mixture of component (A), component (C) and component (D), after or during the force application step.

The catalyst composition for hydrogenation has been previously prepared in a catalyst tank that is different from a reaction system containing a target to be hydrogenated, and it may be then introduced into the reaction system in which the target to be hydrogenated is present, as described later. Alternatively, individual ingredients of the catalyst composition for hydrogenation may be introduced into reaction system, separately.

Since the catalyst composition for hydrogenation obtained by the production method of the present embodiment is excellent in storage stability, it is suitably used in a method of preparing the catalyst composition for hydrogenation in a different catalyst tank and then introducing it into a reaction system.

In a case in which the target to be hydrogenated is a conjugated diene polymer or a copolymer formed of a conjugated diene and a vinyl aromatic hydrocarbon, wherein the polymer or the copolymer has been produced by living anionic polymerization using an organic alkaline metal or an organic alkaline-earth metal as an initiator, the active end of the polymer or copolymer can also be partially or entirely utilized as above described component (B) when the ingredients of a catalyst composition for hydrogenation are introduced into a reaction system for the hydrogenation step.

Moreover, before hydrogenation and after the polymerization of a polymer or a copolymer as a target to be hydrogenated, the active end may be partially or entirely deactivated.

When the ingredients of the catalyst composition for hydrogenation are each separately introduced into a reaction system, if an excess deactivator for the active end of a polymer or copolymer as a target to be hydrogenated is present in the reaction system, such a deactivator may also be considered to be component (D) or a part of component (D).

In such a case, the above-described mass ratio of component (D) to component (A) ((D)/(A)) is calculated, estimating such an excess deactivator as component (D).

When a catalyst composition for hydrogenation is produced in advance in a catalyst tank that is different from a reaction system in which a target to be hydrogenated is present, the atmosphere may be an inert atmosphere or a hydrogen atmosphere.

The temperature applied to the production and storage of the catalyst composition for hydrogenation is preferably in a range of −50° C. to 50° C., and more preferably −20° C. to 30° C.

The time required for the production of the catalyst composition for hydrogenation is different depending on the production temperature. Under conditions of a production temperature of 25° C., it is several minutes to 60 days, and preferably 1 minute to 20 days.

When the catalyst composition for hydrogenation is produced in advance in a catalyst tank that is different from a reaction system in which a target to be hydrogenated is present, if component (A), component (B), component (C) and component (D) that constitute the catalyst composition for hydrogenation are used in the form of a solution prepared by dissolving these components in an inactive organic solvent, it is easily handled, and thus it is preferable.

The inactive organic solvent used in the case in which the components are used in the form of a solution is preferably a solvent that does not react with any forms associated with the hydrogenation reaction. It is preferably the same solvent as that used in the hydrogenation reaction.

When the catalyst composition for hydrogenation is produced in advance in a catalyst tank that is different from a reaction system in which a target to be hydrogenated is present, the produced catalyst composition for hydrogenation is transferred to a hydrogenation reactor (hydrogenation tank) in which the target to be hydrogenated is contained.

From the perspective of the achievement of high activity of hydrogenation, this operation is preferably carried out under a hydrogen atmosphere.

From the perspective of high activity of hydrogenation and suppression of the yellowing of a hydrogenated polymer, the temperature applied to the transfer of the catalyst composition for hydrogenation is preferably a temperature of −30° C. to 100° C., and more preferably −10° C. to 50° C.

Also, from the perspective of high activity of hydrogenation, the catalyst composition for hydrogenation is preferably added to the target to be hydrogenated, immediately before initiation of the hydrogenation reaction.

With regard to the mixing ratio of individual components necessary for exhibiting high activity of hydrogenation and hydrogenation selectivity, the ratio of the metal mole number of component (B) to the metal (Ti) mole number of component (A) (hereinafter referred to as a "molar ratio of Metal (B)/Metal (A)) is preferably in a range of approximately 20 or less.

By determining the mixing ratio of component (A) to component (B) such that the molar ratio of Metal (B)/Metal (A) is in a range of 0.5 to 10, the activity of hydrogenation of the catalyst composition for hydrogenation can be improved. Thus, the above-described molar ratio is most preferable.

When the target to be hydrogenated is a living polymer obtained by living anionic polymerization, the living end acts as a reductant. Thus, when a polymer having a living active end is hydrogenated, from the perspective of achieving the above-described optimal molar ratio of Metal (B)/Metal (A), and carrying out a stable hydrogenation reaction for a longer period of time, the living active end is more preferably deactivated with various compounds having active hydrogen or halogen.

Examples of the above described compound having active hydrogen include, but are not limited to, water, alcohols such as methanol, ethanol, n-propanol, n-butanol, sec-butanol, t-butanol, 1-pentanol, 2-pentanol, 3-pentanol, 1-hexanol, 2-hexanol, 3-hexanol, 1-heptanol, 2-heptanol, 3-heptanol, 4-heptanol, octanol, nonanol, decanol, undecanol, lauryl alcohol, allyl alcohol, cyclohexanol, cyclopentanol and benzyl alcohol, and phenols such as phenol, o-cresol, m-cresol, p-cresol, p-allylphenol, 2,6-di-t-butyl-p-cresol, xylenol, dihydroanthraquinone, dihydroxycoumarin, 1-hydroxyanthraquinone, m-hydroxybenzyl alcohol, resorcinol and leucoaurin.

Moreover, examples of the acid include, but are not limited to, organic carboxylic acids such as acetic acid, propionic acid, butyric acid, isoacetic acid, pentanoic acid, hexanoic acid, heptanoic acid, decalin acid, myristic acid, stearic acid, behenic acid, and benzoic acid.

Furthermore, examples of the compound having halogen include, but are not limited to, benzyl chloride, trimethylsilyl chloride (bromide), t-butylsilyl chloride (bromide), methyl chloride (bromide), ethyl chloride (bromide), propyl chloride (bromide), and n-butyl chloride (bromide).

These acids may be used alone as one kind or in combination of two kinds or more.

[Catalyst Composition For Hydrogenation]

As described above, a catalyst composition for hydrogenation can be obtained by using a titanocene compound (A), a compound (B) containing at least one element selected from the group consisting of elements Li, Na, K, Mg, Zn, Al and Ca, and an unsaturated compound (C), applying a shearing force at a shearing rate of 1000 (1/s) or more to at least the component (A), and mixing the (A), (B) and (C).

[Hydrogenation Method Using Catalyst Composition for Hydrogenation]

The catalyst composition for hydrogenation produced by the production method of the present embodiment can be used in a step of hydrogenating products to be hydrogenated, which are all compounds having an olefinic unsaturated double bond.

The catalyst composition for hydrogenation can be applied, for example, to low molecular weight polymers containing at least one olefinic unsaturated double bond in a molecule thereof, including: aliphatic olefins such as ethylene, propylene, butene, pentene, hexene, heptene, octene, or an isomer thereof; alicyclic olefins such as cyclopentene, methylcyclopentene, cyclopentadiene, cyclohexene, methylcyclohexene, or cyclohexadiene; monomers such as styrene, butadiene, or isoprene; and unsaturated fatty acids and derivatives thereof, and an unsaturated liquid oligomers.

In addition, the catalyst composition for hydrogenation produced by the production method of the present embodiment can also be applied to the selective hydrogenation of an olefinic unsaturated double bond in a conjugated diene polymer or in a copolymer formed of a conjugated diene and an olefin monomer.

The term "selective hydrogenation" used herein means that an olefinic unsaturated double bond in a conjugated diene portion of a conjugated diene polymer or of a copolymer formed of a conjugated diene and an olefin monomer is selectively hydrogenated. For instance, it means that a carbon-carbon double bond in the aromatic ring is not substantially hydrogenated when a vinyl aromatic compound is used as such an olefin monomer.

A selectively hydrogenated product of the olefinic unsaturated double bond of a conjugated diene polymer or of a copolymer formed of a conjugated diene and an olefin monomer is industrially useful as an elastic body or a thermoplastic elastic body.

If the above described product to be hydrogenated is a conjugated diene polymer or a copolymer formed of conjugated diene, the conjugated diene may generally be a conjugated diene having 4 to about 12 carbon atoms. Examples of the conjugated diene include, but are not limited to, 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, and 3-butyl-1,3-octadiene.

From the perspective of obtaining an elastic body that is industrially advantageously developed and is excellent in physical properties, among these conjugated dienes, 1,3-butadiene and isoprene are preferable.

The microstructure of the butadiene portion includes a 1,2-bond and a 1,4-bond (cis+trans). The catalyst composition for hydrogenation of the present embodiment can quantitatively hydrogenate both of them.

In addition, in the isoprene portion, olefinic unsaturated bonds are found in the side chains of a 1,2-bond and a 3,4-bond and in the main chain of a 1,4-bond (cis+trans). The catalyst composition for hydrogenation obtained by the production method of the present embodiment can quantitatively hydrogenate all of them.

The structure and rate of hydrogenating a compound with the catalyst composition for hydrogenation of the present embodiment can be identified using 1H-NMR.

According to the hydrogenation method using the catalyst composition for hydrogenation produced by the production method of the present embodiment, the 1,2-bond and 1,4-bond in the butadiene portion and the side chains of the 1,2-bond and 3,4-bond of the isoprene portion can be particularly selectively hydrogenated.

When 1,3-butadiene is selected as a main ingredient of a conjugated diene polymer hydrogenated with the catalyst composition for hydrogenation, the amount of a 1,2-bond as a microstructure of a butadiene unit portion in a target to be hydrogenated is preferably 8% or more, more preferably 20% or more, and further preferably 30% to 80%, in order to allow the elasticity of an elastomer to exhibit, in particular, at a temperature ranging from a low temperature to room temperature.

Moreover, when isoprene is selected as a main ingredient of a conjugated diene polymer in a target to be hydrogenated, which is hydrogenated with the catalyst composition for hydrogenation, the amount of a 1,4-bond as a microstructure of an isoprene unit portion in the target to be hydrogenated is preferably 50% or more, and more preferably 75% or more, for the same reason as that described above.

In order to allow the catalyst composition for hydrogenation to sufficiently exhibit the effect of selectively hydrogenating only the unsaturated double bond in a conjugated diene unit of a target to be hydrogenated, and in order to obtain an elastic body or a thermoplastic elastic body that is industrially useful and highly valuable, it is preferable to use a copolymer formed of a conjugated diene and a vinyl-substituted aromatic hydrocarbon as a target to be hydrogenated.

Examples of a vinyl aromatic hydrocarbon that is copolymerizable with a conjugated diene include, but are not limited to, styrene, tert-butylstyrene, α-methylstyrene, p-methylstyrene, divinylbenzene, 1,1-diphenylethylene, N,N-dimethyl-p-aminoethylstyrene, and N,N-diethyl-p-aminoethylstyrene. In particular, from the perspective of the ease of polymerization and economical efficiency, styrene and α-methylstyrene are preferable.

Preferred examples of the above described copolymer formed of a conjugated diene and a vinyl-substituted aromatic hydrocarbon include, but are not limited to, a butadiene/styrene copolymer, an isoprene/styrene copolymer, and a butadiene/isoprene/styrene copolymer, since industrially valuable hydrogenated copolymers can be obtained from these copolymers. Such a copolymer of a conjugated diene and a vinyl-substituted aromatic hydrocarbon may be any one of a random copolymer, a block copolymer, a tapered block copolymer and the like, and thus, the type of the copolymer is not particularly limited.

When the catalyst composition for hydrogenation produced by the production method of the present embodiment is used under preferred hydrogenation conditions described later, hydrogenation of a carbon-carbon double bond (aromatic ring) of a vinyl-substituted aromatic hydrocarbon unit in such a copolymer does not substantially take place.

The hydrogenation reaction, in which the catalyst composition for hydrogenation produced by the production method of the present embodiment is used, is preferably carried out by allowing a target to be hydrogenated to come into contact with hydrogen in a solution prepared by dissolving a target to be hydrogenated in an inactive organic solvent.

The term "inactive organic solvent" used herein means a solvent that does not react with any forms associated with the hydrogenation reaction.

Examples of such an inactive organic solvent include, but are not limited to, aliphatic hydrocarbons such as n-pentane, n-hexane, n-heptane, and n-octane; alicyclic hydrocarbons such as cyclohexane, cycloheptane, and cycloheptane; and ethers such as diethyl ether and tetrahydrofuran. These solvents may be used singly as only one type or in the form of a mixture of two or more types of solvents.

Moreover, aromatic hydrocarbons such as benzene, toluene, xylene, and ethyl benzene may also be used, only in a case in which an aromatic double bond is not hydrogenated under the selected hydrogenation conditions.

The hydrogenation reaction is generally carried out by retaining the above-described solution containing a target to be hydrogenated at a predetermined temperature under a hydrogen or inert atmosphere, adding a catalyst composition for hydrogenation to the solution while stirring or not stirring, and then introducing hydrogen gas to compress it to a predetermined pressure. The term "inert atmosphere" used herein means an atmosphere that does not react with any forms associated with the hydrogenation reaction, such as nitrogen, helium, neon or argon. The air atmosphere or oxygen atmosphere is not preferable because it oxidizes a catalyst composition for hydrogenation, thereby causing deactivation of the catalyst composition for hydrogenation.

Since the catalyst composition for hydrogenation produced by the production method of the present embodiment is excellent in storage stability, it is preferably used in a hydrogenation method involving continuously supplying a target to be hydrogenated and a catalyst composition for hydrogenation to a reactor in which a hydrogenation reaction is carried out (continuous hydrogenation).

Moreover, the catalyst composition for hydrogenation produced by the production method of the present embodiment can also be used in a batch-type hydrogenation method.

The amount of the catalyst composition for hydrogenation added in the hydrogenation step is preferably 0.001 to 20 mmol per 100 g of a target to be hydrogenated, in terms of the molar amount of component (A).

If the amount of the catalyst composition for hydrogenation added is set in this additive amount range, it is possible to preferentially hydrogenate an olefinic unsaturated double bond, when the target to be hydrogenated is a copolymer formed of a conjugated diene and a vinyl-substituted aromatic hydrocarbon. Thus, hydrogenation of the double bond of an aromatic ring in the copolymer does not substantially take place. Hence, extremely high hydrogenation selectivity can be realized.

Even if the amount of the catalyst composition for hydrogenation added is more than 20 mmol per 100 g of a target to be hydrogenated, in terms of the molar amount of component (A), the hydrogenation reaction can be carried out. However, the use of an unnecessary amount of catalyst composition for hydrogenation is economically inefficient, and further, since it needs complicated operations such as the removal of the catalyst composition for hydrogenation and decalcification after the hydrogenation reaction, it is disadvantageous for the step.

The amount of the catalyst composition for hydrogenation used to quantitatively hydrogenate the unsaturated double bond of a conjugated diene unit of a polymer under the selected conditions can be preferably 0.01 to 5 mmol per 100 g of a target to be hydrogenated, in terms of the molar amount of component (A).

In the hydrogenation reaction, gaseous hydrogen is preferably introduced into a hydrogenation reaction tank.

The hydrogenation reaction is more preferably carried out under stirring, and thereby, the introduced hydrogen is allowed to sufficiently quickly come into contact with the target to be hydrogenated.

The hydrogenation reaction is generally carried out in a temperature range of 0° C. to 200° C.

If the temperature is lower than 0° C., the hydrogenation speed becomes slow, and thus, since a large amount of catalyst composition for hydrogenation is required, it is not economically efficient. On the other hand, if the temperature is higher than 200° C., side reactions, decomposition and gelatinization easily occur in combination with the hydrogenation reaction, and also, the catalyst composition for hydrogenation is likely to be deactivated. As a result, the activity of hydrogenation unfavorably decreases.

A more preferred temperature range is 20° C. to 180° C.

The hydrogen pressure used in the hydrogenation reaction is preferably 1 to 100 kgf/cm$^2$.

If the hydrogen pressure is less than 1 kgf/cm$^2$, the hydrogenation speed becomes slow, and thus, the hydrogenation rate becomes insufficient. If the hydrogen pressure is more than 100 kgf/cm$^2$, the hydrogenation reaction is almost completed at the same time as pressure rising, and it unfavorably results in unnecessary side reactions or gelatinization.

A more preferred hydrogen pressure applied to hydrogenation is 2 to 30 kgf/cm$^2$, and an optimal hydrogen pressure is selected based on the correlation with the amount of the catalyst composition for hydrogenation added, etc. Substantially, it is preferable that a higher hydrogen pressure be selected to carry out the hydrogenation reaction, as the above-described amount of the catalyst composition for hydrogenation decreases.

In addition, the time required for the hydrogenation reaction is generally several seconds to 50 hours.

The hydrogenation reaction time and the hydrogenation pressure are appropriately selected in the above-described ranges, depending on a desired hydrogenation rate.

By the above-described hydrogenation step, any desired hydrogenation rate depending on purposes can be obtained from the olefinic unsaturated double bond of an olefin compound, and from the olefinic unsaturated double bonds of a conjugated diene copolymer and a copolymer formed of a conjugated diene and a vinyl aromatic hydrocarbon.

After the hydrogenation reaction has been carried out using the catalyst composition for hydrogenation produced by the production method of the present embodiment, a hydrogenated product can be easily separated from a solution containing the hydrogenated product by chemical or physical means such as distillation or precipitation.

In particular, when the target to be hydrogenated is a polymer, a residue of catalyst composition for hydrogenation can be removed from the polymer solution obtained after the hydrogenation reaction, as necessary, and the hydrogenated polymer can be then separated from the solution.

Examples of the separation method include a method comprising adding a polar solvent serving as a poor solvent to the hydrogenated polymer, such as acetone or alcohol, to the reaction solution after the hydrogenation to precipitate the hydrogenated polymer and then recovering it, a method comprising adding the reaction solution after the hydrogenation to boiling water while stirring, and then distilling to recover the hydrogenated polymer together with the solvent, and a method comprising directly heating the reaction solution to distill away the solvent.

EXAMPLES

Hereinafter, the present invention will be described in detail by way of the following specific examples and comparative examples. However, these examples are not intended to limit the scope of the present invention.

First, evaluation methods carried out in the examples and the comparative examples will be described below.

[Evaluation Method]

<Hydrogenation Rate>

Batch-type hydrogenation was carried out in Examples 1 to 18, Examples 21 to 34, Comparative Examples 1 to 8, and Comparative Examples 11 to 13, whereas continuous hydrogenation was carried out in Examples 19, 20, 35 and 36, and Comparative Examples 9, 10, 14 and 15.

In all of the examples and the comparative examples, a catalyst composition for hydrogenation was added, such that the amount of Ti became 150 ppm based on the after-described polymer solution to be hydrogenated, and thereafter, a hydrogenation reaction was carried out at a hydrogen pressure of 5 kgf/cm$^2$ at a temperature of 90° C. and a retention time of 30 minutes. The hydrogenation rate obtained was measured using NMR as described later.

After the production of a catalyst composition for hydrogenation, both a case in which it was used immediately after the production (initial stage) and a case in which it was used after it had been stored at 30° C. for 30 days were evaluated.

It was considered that a higher hydrogenation rate was better, and the hydrogenation rate that was 99.5% or more was evaluated as ⊚, the hydrogenation rate that was 99.0% or more and less than 99.5% was evaluated as ○, the hydrogenation rate that was 97.0% or more and less than 99.0% was evaluated as Δ, and the hydrogenation rate that was less than 97% was evaluated as x.

(NMR: Method of Measuring Hydrogenation Rate)

The hydrogenation rate of unsaturated groups in a conjugated diene was measured using nuclear magnetic resonance spectrum analysis (NMR) under the following conditions.

After the hydrogenation reaction, the reaction product was precipitated in a large amount of methanol to recover a hydrogenated polymer, and thereafter, the hydrogenated polymer was subjected to extraction with acetone and vacuum drying, and 1H-NMR measurement was then carried out.

Measurement apparatus: JNM-LA400 (manufactured by JEOL)

Solvent: deuterated chloroform

Measurement sample: samples obtained before and after hydrogenation of the after-described polymer to be hydrogenated Sample concentration: 50 mg/mL Measuring frequency: 400 MHz Chemical shift standard: TMS (tetramethylsilane)

Pulse delay: 2.904 seconds

Number of scannings: 64

Pulse width: 45°

Measurement temperature: 26° C.

<Filter Clogging in Extruder>

0.3 Parts by mass of octadecyl-3-(3,5-di-t-butyl-4-hydroxyphenyl)propionate was added as a stabilizer to 100 parts by mass of a hydrogenated polymer that had been subjected to a hydrogenation reaction with a catalyst composition for hydrogenation immediately after the production thereof (initial stage), which had been used in the above described measurement of a hydrogenation rate.

An α-(p-nonylphenyl)-ω-hydroxypoly(oxyethylene) mixture of dihydrodiene phosphate and monohydrodiene phosphate (wherein the oxyethylene unit of poly(oxyethylene) was 9 to 10 as a mean value) was added as a crumbing agent to water for stripping, resulting in a concentration of 20 ppm.

Thereafter, stripping was carried out at a temperature of 90° C. to 98° C., and the solvent was then removed.

After the removal of the solvent from the tank, the concentration of the polymer in slurry after the above-described stripping in the tank was approximately 5% by mass.

Subsequently, the slurry that was a water dispersion of the above obtained crumb-like polymer was supplied to a rotation screen, and hydrated crumb with a water content of approximately 45% by mass was obtained. This hydrated crumb was supplied to a single screw extruder-type water wringing device to obtain a dehydrated polymer.

Thereafter, the above obtained polymer (hydrogenated polymer) was supplied to a twin screw one vented extruder, and it was extruded at a cylinder temperature of 220° C., at a screw rotation number of 200 rpm, at a vent pressure of approximately 200 mmHg (absolute pressure), and was then dried.

During this operation, as the time required until a 200-mesh filter equipped into the tip section of the extruder was clogged and the pressure became 20 kgf/cm² or more was prolonged, it was determined to be economically favorable, and the filter clogging was then evaluated according to the following standards.

The period of time that was 3 hours or more was evaluated as excellent ⊚, the period of time that was 2 hours or more and less than 3 hours was evaluated as good ○, the period of time that was 1 hour or more and less than 2 hours was evaluated as fair Δ, and the period of time that was less than 1 hour was evaluated as poor x.

Constitutional components of a catalyst composition for hydrogenation produced in each of the examples and the comparative examples will be described below.

Component (A)

(A-1): Synthesis of bis(η(5)-cyclopentadienyl)titanium di(p-tolyl)

200 Milliliter of anhydrous ether was added to a three-necked flask equipped with a stirrer, a dripping funnel and a reflux condenser (hereinafter also referred to as a "device").

The device was dried with dry helium, and 17.4 g (2.5 mol) of a piece of lithium wire was then cut and dropped into the flask. Thereafter, a solution of 300 mL of ether and 171 g (1 mol) of p-bromotoluene was added in a small amount dropwise to the flask at room temperature, and the total amount of ether solution of p-bromotoluene was gradually added thereto under reflux.

After the reaction, the reaction solution was filtrated under a helium atmosphere, so as to obtain a colorless transparent p-tolyl lithium solution.

To a 2-L three-necked flask equipped with a stirrer and a dripping funnel, which had been substituted with dry helium, 99.6 g (0.4 mol) of bis(η(5)-cyclopentadienyl)titanium dichloride and 500 mL of anhydrous ether were added.

The previously synthesized ether solution of p-tolyl lithium was added dropwise to the above-described flask at room temperature under stirring for approximately 2 hours.

Thereafter, the reaction mixture was separated by filtration in the air, and an insoluble portion was then washed with dichloromethane. The filtrate was gathered with the washing solution, and the solvent was then removed under reduced pressure.

The residue was dissolved in a small amount of dichloromethane, and petroleum ether was then added to the solution to carry out recrystallization.

The obtained crystal was separated by filtration, and the filtrate was then concentrated again. Thus, the above-described operations were repeatedly carried out to obtain bis(η(5)-cyclopentadienyl)titanium di(p-tolyl).

The yield was 87%.

The obtained crystal had an orange-yellow needle form, and the solubility in toluene and cyclohexane was high. The crystal had a melting point of 145° C. and element analysis value: C, 80.0; H, 6.7; Ti, 13.3.

(A-2): Synthesis of bis(η(5)-cyclopentadienyl)titanium di(phenyl)

157 Grams (1 mol) of bromobenzene was used instead of the p-bromotoluene used in above described (A-1). Other than this exception, the same conditions as those in above described (A-1) were applied to synthesize phenyl lithium.

Using the phenyl lithium, bis(η(5)-cyclopentadienyl)titanium diphenyl was obtained by the same step as that in above described (A-1). The yield amount was 120 g (yield: 90%). The obtained crystal had an orange-yellow needle form, and the solubility in toluene and cyclohexane was slightly high. The crystal had a melting point of 147° C. and element analysis value: C, 79.5; H, 6.1; Ti, 14.4.

(A-3): Synthesis of bis(η(5)-cyclopentadienyl)titanium di(3,4-xylyl)

4-Bromo-o-xylene (1 mol) was used instead of the p-bromotoluene used in above described (A-1). Other than this exception, the same conditions as those in above described (A-1) were applied to synthesize bis(η(5)-cyclopentadienyl)titanium di(3,4-xylyl). The yield was 83%. The obtained crystal had a yellow needle form, and the solubility in toluene and cyclohexane was high. The crystal had a melting point of 155° C. and element analysis value: C, 80.6; H, 7.2; Ti, 12.2.

(A-4): Bis(η(5)-1,3-dimethylcyclopentadienyl)titanium dichloride

A product obtained by recrystallization of a reagent manufactured by NIHON FINE CHEMICAL Co., Ltd. in dichloromethane was used.

Component (B)

(B-1): Triethyl aluminum; hexane solution (manufactured by Tosoh Akzo Corp.) was directly used.
(B-2): sec-Butyl lithium; hexane solution (manufactured by KANTO CHEMICAL CO., INC.) was separated by filtration under an inert atmosphere, and a yellow transparent portion was used.

Component (C)

(C-PB): Polybutadiene (Ricon 142, manufactured by Ricon; the ratio of the olefinic unsaturated double bond content of side chains based on the total olefinic unsaturated double bond content was 0.55, and the number average molecular weight was 4000) was used.
(C-1): Myrcene
(C-2): Isoprene
(C-3): 1,7-Octadiene Component (D)

(D-1): Tetrahydrofuran
(D-2): N,N,N',N'-tetramethylethylenediamine

Examples 1 to 20 and [Comparative Examples 1 to 10]

A catalyst composition for hydrogenation was produced as follows.

In Examples 1 to 15, Examples 18 to 20, and Comparative Examples 1 to 10, component (A), component (C), and component (D) were mixed at the ratio shown in Table 1 below. Thereafter, using the below-described device, a shearing force was applied to the obtained mixture for 2 hours under the below-described conditions, and component (B) was then added to the reaction mixture, followed by application of a shearing force for 30 minutes.

In Example 16, component (A) was mixed with component (C) at the ratio shown in Table 1 below. Thereafter, using the below-described device, a shearing force was applied to the obtained mixture for 2 hours under the below-described conditions, and component (B) was then added to the reaction mixture, followed by application of a shearing force for 30 minutes. Thereafter, component (D) was added to the reaction mixture, and a shearing force was applied thereto for 30 minutes.

In Example 17, the ratio shown in Table 1 below was applied, and a shearing force was applied to component (A) for 2 hours using the below-described device under the below-described conditions. Thereafter, component (B) was added to the reaction mixture, and a shearing force was then applied thereto for 30 minutes. Thereafter, component (C) and component (D) were added to the reaction mixture, and a shearing force was then applied thereto for 30 minutes.

(Device and Conditions for Applying Shearing Force, Used in Examples 1 to 4, 7, and 9 to 20)

Homogenizer: Homo Mixer MARKII (PRIMIX, trade name, 0.2 kW)
Throughput: 1.5 kg of a cyclohexane solution containing 4% by mass of component (A)
Rotation number: 1200 rpm, Shearing rate: 3500 (1/s)

(Device and Conditions for Applying Shearing Force, Used in Example 5)

Homogenizer: Homo Mixer MARKII (PRIMIX, trade name, 0.2 kW)
Throughput: 1.5 kg of a cyclohexane solution containing 4% by mass of component (A)
Rotation number: 12000 rpm, Shearing rate: 35000 (1/s)

(Device and Conditions for Applying Shearing Force, Used in Examples 6 and 8)

Emulsifying disperser: CAVITRON CD1010 (Pacific Machinery & Engineering Co., Ltd., trade name, 7.5 kW)
Throughput: 100 kg of a cyclohexane solution containing 4% by mass of component (A)
Rotation number: 5000 rpm, Shearing rate: 51600 (1/s)

(Device and Conditions for Applying Shearing Force, Used in Comparative Examples 1 to 10)

Emulsifying disperser: Homo Disper (PRIMIX, trade name, 0.2 kW)
Throughput: 2.5 kg of a cyclohexane solution containing 4% by mass of component (A)
Rotation number: 600 rpm, Shearing rate: 126 (1/s)

Examples 21 to 36 and Comparative Examples 11 to 15

A catalyst composition for hydrogenation was produced as follows.

In Examples 21 to 28, Examples 31 to 36, and Comparative Examples 11 to 15, component (A), component (C), and component (D) were mixed at the ratio shown in Table 2 below. Thereafter, using the below-described device, a shearing force was applied to the obtained mixture for 2 hours under the below-described conditions, and component (B) was then added to the reaction mixture, followed by application of a shearing force for 30 minutes.

In Example 29, component (A) was mixed with component (C) at the ratio shown in Table 2 below. Thereafter, using the below-described device, a shearing force was applied to the obtained mixture for 2 hours under the below-described conditions, and component (B) was then added to the reaction mixture, followed by application of a shearing force for 30 minutes. Thereafter, component (D) was added to the reaction mixture, and a shearing force was applied thereto for 30 minutes.

In Example 30, the ratio shown in Table 2 below was applied, and a shearing force was applied to component (A) for 2 hours using the below-described device under the below-described conditions. Thereafter, component (B) was added to the reaction mixture, and a shearing force was then applied thereto for 30 minutes. Thereafter, component (C) and component (D) were added to the reaction mixture, and a shearing force was then applied thereto for 30 minutes.

(Device and Conditions for Applying Shearing Force, Used in Examples 21 to 23, 25, and 27 to 36)

Homogenizer: Homo Mixer MARKII (PRIMIX, trade name, 0.2 kW)
Throughput: 1.5 kg of a cyclohexane solution containing 4% by mass of component (A)
Rotation number: 1200 rpm, Shearing rate: 3500 (1/s)

(Device and Conditions for Applying Shearing Force, Used in Example 24)

Homogenizer: Homo Mixer MARKII (PRIMIX, trade name, 0.2 kW)
Throughput: 1.5 kg of a cyclohexane solution containing 4% by mass of component (A)
Rotation number: 12000 rpm, Shearing rate: 35000 (1/s)

(Device and Conditions for Applying Shearing Force, Used in Example 26)

Emulsifying disperser: CAVITRON CD1010 (Pacific Machinery & Engineering Co., Ltd., trade name, 7.5 kW)
Throughput: 100 kg of a cyclohexane solution containing 4% by mass of component (A)
Rotation number: 5000 rpm, Shearing rate: 51600 (1/s)

(Device and Conditions for Applying Shearing Force, Used in Comparative Examples 11 to 15)

Emulsifying disperser: Homo Disper (PRIMIX, trade name, 0.2 kW)
Throughput: 2.5 kg of a cyclohexane solution containing 4% by mass of component (A)
Rotation number: 600 rpm, Shearing rate: 126 (1/s)

[Polymer to be Hydrogenated]

A polymer to be hydrogenated was produced as follows.

(Polymerization of Styrene-Butadiene-Styrene Block Copolymer)

400 Kg of cyclohexane, 15 kg of styrene monomer, 110 g of n-butyl lithium, and 2.5 kg of tetrahydrofuran were added into an autoclave, and the mixture was then polymerized under stirring at 60° C. for 3 hours. Subsequently, 70 kg of 1,3-butadiene monomer was added to the reaction mixture, and the thus obtained mixture was then polymerized at 60° C. for 3 hours.

Finally, 15 kg of styrene monomer was added to the reaction mixture, and the thus obtained mixture was then polymerized at 60° C. for 3 hours.

The active end was deactivated with water.

The obtained styrene-butadiene-styrene copolymer was a complete block copolymer, and the styrene content was 30% by mass, the content of the 1,2-vinyl bond of a butadiene unit was 45 mol %, and the weight average molecular weight measured using GPC (molecular weight in terms of polystyrene) was approximately 60,000.

The above described styrene content and the content of the 1,2-vinyl bond of the butadiene unit were measured using NMR, which had been used in the above described measurement of a hydrogenation rate.

The evaluation results regarding the hydrogenation rate of each polymer and filter clogging in an extruder are shown in the following Table 1 and Table 2.

TABLE 1

| | | (A) Type | (A) (mmol) | (B) Type | (B) (mmol) | (C) Type | (C) Mass ratio to (A) (–) | (D) Type | (D) Mass ratio to (A) (–) | Shearing rate (1/s) | Rate of hydrogenating polymer Initial stage | Rate of hydrogenating polymer After 30 days | Filter clogging in extruder |
|---|---|---|---|---|---|---|---|---|---|---|---|---|---|
| Example | 1 | A-1 | 0.015 | B-1 | 0.0375 | C-PB | 4 | D-2 | — | 3500 | ○ | △ | △ |
| | 2 | A-1 | 0.015 | B-1 | 0.0375 | C-PB | 4 | D-2 | 0.5 | 3500 | ○ | ○ | ○ |
| | 3 | A-2 | 0.015 | B-1 | 0.0375 | C-PB | 4 | D-2 | 0.5 | 3500 | ○ | ○ | ○ |
| | 4 | A-3 | 0.015 | B-1 | 0.0375 | C-PB | 4 | D-2 | 0.5 | 3500 | ○ | ○ | ○ |
| | 5 | A-3 | 0.015 | B-1 | 0.0375 | C-PB | 4 | D-2 | 0.5 | 35000 | ⊚ | ○ | ⊚ |
| | 6 | A-3 | 0.015 | B-1 | 0.0375 | C-PB | 4 | D-2 | 0.5 | 51600 | ⊚ | ○ | ⊚ |
| | 7 | A-4 | 0.015 | B-1 | 0.0375 | C-PB | 4 | D-2 | 0.5 | 3500 | ⊚ | ○ | ○ |
| | 8 | A-4 | 0.015 | B-1 | 0.0375 | C-PB | 4 | D-2 | 0.5 | 51600 | ⊚ | ○ | ⊚ |
| | 9 | A-1 | 0.015 | B-2 | 0.0375 | C-PB | 4 | D-2 | 0.5 | 3500 | ⊚ | ○ | ⊚ |
| | 10 | A-1 | 0.015 | B-1 | 0.0375 | C-PB | 4 | D-2 | 0.2 | 3500 | ⊚ | ○ | ○ |
| | 11 | A-4 | 0.015 | B-2 | 0.0375 | C-PB | 4 | D-2 | 0.5 | 3500 | ⊚ | ○ | ⊚ |
| | 12 | A-1 | 0.015 | B-1 | 0.0375 | C-PB | 2 | D-2 | 0.2 | 3500 | ⊚ | ○ | ⊚ |
| | 13 | A-1 | 0.015 | B-2 | 0.0375 | C-PB | 2 | D-2 | 0.2 | 3500 | ⊚ | ⊚ | ⊚ |
| | 14 | A-2 | 0.015 | B-2 | 0.0375 | C-PB | 2 | D-2 | 0.2 | 3500 | ⊚ | ⊚ | ⊚ |
| | 15 | A-3 | 0.015 | B-2 | 0.0375 | C-PB | 2 | D-2 | 0.2 | 3500 | ⊚ | ⊚ | ⊚ |
| | 16 | A-3 | 0.015 | B-2 | 0.0375 | C-PB | 2 | D-2 | 0.2 | 3500 | ⊚ | ○ | ⊚ |
| | 17 | A-3 | 0.015 | B-2 | 0.0375 | C-PB | 2 | D-2 | 0.2 | 3500 | ⊚ | ○ | ○ |
| | 18 | A-4 | 0.015 | B-2 | 0.0375 | C-PB | 2 | D-2 | 0.2 | 3500 | ⊚ | ⊚ | ⊚ |
| | 19 | A-1 | 0.015 | B-1 | 0.0375 | C-PB | 2 | D-2 | 0.2 | 3500 | ○ | ○ | ○ |
| | 20 | A-4 | 0.015 | B-2 | 0.0375 | C-PB | 2 | D-2 | 0.2 | 3500 | ⊚ | ○ | ⊚ |
| Comparative Example | 1 | A-1 | 0.015 | B-1 | 0.0375 | C-PB | 4 | D-2 | 0.5 | 126 | ○ | △ | X |
| | 2 | A-2 | 0.015 | B-1 | 0.0375 | C-PB | 4 | D-2 | 0.5 | 126 | ○ | △ | X |
| | 3 | A-3 | 0.015 | B-1 | 0.0375 | C-PB | 4 | D-2 | 0.5 | 126 | ○ | △ | X |
| | 4 | A-4 | 0.015 | B-1 | 0.0375 | C-PB | 4 | D-2 | 0.5 | 126 | ○ | △ | X |
| | 5 | A-1 | 0.015 | B-2 | 0.0375 | C-PB | 2 | D-2 | 0.2 | 126 | ○ | ○ | X |
| | 6 | A-2 | 0.015 | B-2 | 0.0375 | C-PB | 2 | D-2 | 0.2 | 126 | ○ | ○ | X |
| | 7 | A-3 | 0.015 | B-2 | 0.0375 | C-PB | 2 | D-2 | 0.2 | 126 | ○ | ○ | X |
| | 8 | A-4 | 0.015 | B-2 | 0.0375 | C-PB | 2 | D-2 | 0.2 | 126 | X | X | X |
| | 9 | A-1 | 0.015 | B-1 | 0.0375 | C-PB | 2 | D-2 | 0.2 | 126 | △ | X | X |
| | 10 | A-4 | 0.015 | B-2 | 0.0375 | C-PB | 2 | D-2 | 0.2 | 126 | X | X | X |

TABLE 2

| | | (A) Type | (A) (mmol) | (B) Type | (B) (mmol) | (C) Type | (C) Mass ratio to (A) (–) | (D) Type | (D) Mass ratio to (A) (–) | Shearing rate (1/s) | Rate of hydrogenating polymer Initial stage | Rate of hydrogenating polymer After 30 days | Filter clogging in extruder |
|---|---|---|---|---|---|---|---|---|---|---|---|---|---|
| Example | 21 | A-1 | 0.015 | B-1 | 0.0375 | C-1 | 2 | — | — | 3500 | ○ | △ | ○ |
| | 22 | A-1 | 0.015 | B-1 | 0.0375 | C-1 | 2 | D-1 | 0.5 | 3500 | ○ | ○ | ○ |
| | 23 | A-3 | 0.015 | B-1 | 0.0375 | C-1 | 2 | D-1 | 0.5 | 3500 | ○ | ○ | ○ |
| | 24 | A-3 | 0.015 | B-1 | 0.0375 | C-1 | 2 | D-1 | 0.5 | 35000 | ⊚ | ○ | ⊚ |
| | 25 | A-4 | 0.015 | B-1 | 0.0375 | C-1 | 2 | D-1 | 0.5 | 3500 | ○ | ○ | ○ |
| | 26 | A-4 | 0.015 | B-1 | 0.0375 | C-1 | 2 | D-1 | 0.5 | 51600 | ⊚ | ○ | ○ |
| | 27 | A-1 | 0.015 | B-1 | 0.0375 | C-1 | 4 | D-1 | 0.5 | 3500 | ○ | △ | ○ |
| | 28 | A-1 | 0.015 | B-2 | 0.0375 | C-1 | 2 | D-1 | 0.5 | 3500 | ⊚ | ○ | ⊚ |
| | 29 | A-1 | 0.015 | B-2 | 0.0375 | C-1 | 2 | D-1 | 0.5 | 3500 | ⊚ | ○ | ○ |

TABLE 2-continued

| | | Catalyst composition for hydrogenation | | | | | | | Evaluation results | | |
|---|---|---|---|---|---|---|---|---|---|---|---|
| | | (A) | | (B) | | (C) | Mass ratio to (A) | (D) | Mass ratio to (A) | Shearing rate | Rate of hydrogenating polymer | | Filter clogging in extruder |
| | | Type | (mmol) | Type | (mmol) | Type | (−) | Type | (−) | (1/s) | Initial stage | After 30 days | |
| | 30 | A-1 | 0.015 | B-2 | 0.0375 | C-1 | 2 | D-1 | 0.5 | 3500 | ○ | ○ | ○ |
| | 31 | A-1 | 0.015 | B-1 | 0.0375 | C-2 | 2 | D-1 | 0.5 | 3500 | ○ | Δ | ○ |
| | 32 | A-1 | 0.015 | B-2 | 0.0375 | C-3 | 2 | D-1 | 0.5 | 3500 | ○ | ○ | ◎ |
| | 33 | A-1 | 0.015 | B-1 | 0.0375 | C-1 | 2 | D-2 | 0.5 | 3500 | ◎ | ○ | ○ |
| | 34 | A-4 | 0.015 | B-2 | 0.0375 | C-1 | 2 | D-2 | 0.5 | 3500 | ◎ | ○ | ◎ |
| | 35 | A-1 | 0.015 | B-1 | 0.0375 | C-1 | 2 | D-1 | 0.5 | 3500 | ○ | Δ | ○ |
| | 36 | A-4 | 0.015 | B-2 | 0.0375 | C-1 | 2 | D-2 | 0.5 | 3500 | ◎ | ○ | ○ |
| Comparative Example | 11 | A-1 | 0.015 | B-1 | 0.0375 | C-1 | 2 | — | — | 126 | Δ | X | X |
| | 12 | A-1 | 0.015 | B-1 | 0.0375 | C-1 | 2 | D-1 | 0.5 | 126 | ○ | Δ | X |
| | 13 | A-4 | 0.015 | B-1 | 0.0375 | C-1 | 2 | D-1 | 0.5 | 126 | ○ | Δ | X |
| | 14 | A-1 | 0.015 | B-1 | 0.0375 | C-1 | 2 | D-1 | 0.5 | 126 | Δ | Δ | X |
| | 15 | A-4 | 0.015 | B-2 | 0.0375 | C-1 | 2 | D-2 | 0.5 | 126 | X | X | X |

It is to be noted that components (A) ((A-1) to (A-4)), components (B) ((B-1) and (B-2)), components (C) ((C-PB) and (C-1) to (C-3)), and components (D) ((D-1) and (D-2)) in Table 1 and Table 2 are as follows.
Components (A)
(A-1): Bis(η(5)-cyclopentadienyl)titanium di(p-tolyl)
(A-2): Bis(η(5)-cyclopentadienyl)titanium di(phenyl)
(A-3): Bis(η(5)-cyclopentadienyl)titanium di(3,4-xylyl)
(A-4): Bis(η(5)-1,3-dimethylcyclopentadienyl)titanium dichloride
Components (B)
(B-1): Triethyl aluminum
(B-2): sec-Butyl lithium
Components (C)
(C-PB): Polybutadiene
(C-1): Myrcene
(C-2): Isoprene
(C-3): 1,7-Octadiene
Components (D)
(D-1): Tetrahydrofuran
(D-2): N,N,N',N'-tetramethylethylenediamine It was found that, when the catalyst compositions for hydrogenation produced in Examples 1 to 36 were used, these compositions had high activity of hydrogenation, and the degree of filter clogging in an extruder upon the production of a hydrogenated polymer could be reduced.

The present application is based on Japanese patent applications (Japanese Patent Application No. 2012-235006) and (Japanese Patent Application No. 2012-235009) filed with the Japan Patent Office on Oct. 24, 2012; the disclosure of which is hereby incorporated by reference.

INDUSTRIAL APPLICABILITY

The catalyst composition for hydrogenation obtained by the method for producing a catalyst composition for hydrogenation of the present invention has industrial applicability as a catalyst composition for hydrogenation, which is used in a hydrogenation step for producing a hydrogenated polymer compound used as a modifier for polypropylene or polyethylene.

The invention claimed is:
1. A method of producing a catalyst composition for hydrogenation, wherein:

(A): a titanocene compound represented by following general formula (1):

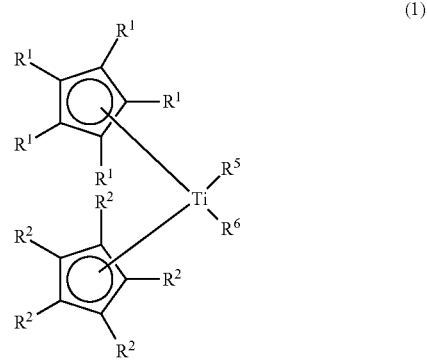

wherein $R^5$ and $R^6$ each represent a group selected from the group consisting of hydrogen, a hydrocarbon group having 1 to 12 carbon atoms, an aryloxy group, an alkoxy group, and a halogen group, and is optimally the same or different; and $R^1$ and $R^2$ represent a group selected from the group consisting of hydrogen and a hydrocarbon group having 1 to 12 carbon atoms, and is optimally the same or different;
provided that $R^1$ and $R^2$ are not all hydrogens or all hydrocarbon groups having 1 to 12 carbon atoms;
(B): an organic compound containing at least one element selected from the group consisting of elements Li, Na, K, Mg, Zn, Al, and Ca; and
(C): an unsaturated compound that is an unsaturated polymer (C1) having a fraction of an olefinic unsaturated double bond content of the side chains based on a total olefinic unsaturated double bond content of 0.25 to 1.0, or an unsaturated compound (C2) having a molecular weight of 400 or less
are used,
a mass ratio of the (C) to the (A) is set in a range of 0.1 to 8, and
the method comprises:
mixing the (A), the (B), and the (C) by applying a shearing force at a shearing rate of 3500 s$^{-1}$ or more to the (A), the (B), and the (C).

2. The method of producing the catalyst composition for hydrogenation according to claim 1, wherein the (C) is an unsaturated polymer (C1) having a fraction of an olefinic unsaturated double bond content of the side chains based on a total olefinic unsaturated double bond content of 0.25 to 1.0.

3. The method of producing the catalyst composition for hydrogenation according to claim 1, wherein the (C) is an unsaturated compound (C2) having a molecular weight of 400 or less.

4. The method of producing the catalyst composition for hydrogenation according to claim 1, wherein a mass ratio of the (C) to the (A) is set in a range of 0.1 to 4.

5. The method of producing the catalyst composition for hydrogenation according to claim 1, wherein
the unsaturated polymer (C1) has a fraction of an olefinic unsaturated double bond content of the side chains based on an olefinic unsaturated double bond content of 0.25 to 1.0, and
a mass ratio of the (C1) to the (A) is set in a range of 0.3 to 8.

6. The method of producing the catalyst composition for hydrogenation according to claim 5 comprising:
mixing the (A), the (B), and the (C) after the (B) is added to the mixture of the (A) and the (C), after or during applying a shearing force at a shearing rate of 3500 s$^{-1}$ or more to a mixture of the (A) and the (C).

7. The method of producing the catalyst composition for hydrogenation according to claim 6, further comprising a step of mixing a polar compound (D), wherein
a mass ratio of the (D) to the (A) is set in a range of 0.01 to 2.

8. The method of producing the catalyst composition for hydrogenation according to claim 1, wherein the (B) is added to a mixture of the (A) and the (C), after the force application step.

9. The method of producing the catalyst composition for hydrogenation according to claim 1 comprising:
mixing the (A), the (B), and the (C), wherein the (B) is added to the mixture of the (A) and the (C), after or during applying a shearing force at a shearing rate of 3500 s$^{-1}$ or more to a mixture of the (A) and the (C).

10. The method of producing the catalyst composition for hydrogenation according to claim 1, further comprising a step of mixing a polar compound (D), wherein
a mass ratio of the (D) to the (A) is set in a range of 0.01 to 2.

11. The method of producing the catalyst composition for hydrogenation according to claim 1, further comprising a step of mixing a polar compound (D), wherein
a mass ratio of the (D) and the (A) is set in a range of 0.01 to 1.

12. The method of producing the catalyst composition for hydrogenation according to claim 1, wherein the (B) is an organic lithium compound.

13. The method of producing the catalyst composition for hydrogenation according to claim 1, wherein a conjugated diene polymer, or a copolymer formed of a conjugated diene and a vinyl aromatic hydrocarbon is used as the unsaturated compound (C).

14. The method of producing the catalyst composition for hydrogenation according to claim 1, wherein the force application step of applying the shearing force to at least the (A) is at a shearing rate of 3,000 s$^{-1}$ or more and 51,600 s$^{-1}$ or less.

15. The method of producing the catalyst composition for hydrogenation according to claim 1, wherein the force application step of applying the shearing force to at least the (A) is at a shearing rate of 3,500 s$^{-1}$ or more and 51,600 s$^{-1}$ or less.

16. The method of producing the catalyst composition for hydrogenation according to claim 1, wherein the shearing force is applied by a homogenizer.

17. The method of producing the catalyst composition for hydrogenation according to claim 1, wherein mixing the (A), the (B) and the (C) comprises applying a shearing force at a shearing rate of 3,500 s$^{-1}$ or more to the (A), the (B) and the (C).

18. The method of producing the catalyst composition for hydrogenation according to claim 17, wherein
the (B) is at least one compound selected from the group consisting of organic lithium compounds, organic sodium compounds, organic potassium compounds, organic zinc compounds, organic magnesium compounds, organic aluminium compounds and organic calcium compounds.

19. The method of producing the catalyst composition for hydrogenation according to claim 17, wherein
the (A) is a compound selected from the group consisting of bis(η(5)-cyclopentadienyl)titanium di(p-tolyl), bis(η(5)-cyclopentadienyl)titanium di(phenyl), bis(η(5)-cyclopentadienyl)titanium di(3,4-xylyl), and bis(η(5)-1,3-dimethylcyclopentadienyl)titanium dichloride;
the (B) is a compound selected from the group consisting of triethyl aluminum and sec-Butyl lithium; and
the (C) is an unsaturated compound selected from the group consisting of polybutadiene, myrcene, isoprene, and 1,7-octadiene.

* * * * *